United States Patent [19]

Yamanashi et al.

[11] Patent Number: 4,815,829
[45] Date of Patent: Mar. 28, 1989

[54] TELEPHOTO ZOOM LENS SYSTEM

[75] Inventors: Takanori Yamanashi; Yasuji Ogata, both of Tokyo, Japan

[73] Assignee: Olympus Optical Co., Ltd., Tokyo, Japan

[21] Appl. No.: 868,678

[22] Filed: May 30, 1986

[30] Foreign Application Priority Data

May 31, 1985 [JP] Japan .................. 60-116599

[51] Int. Cl.[4] ............................... C02B 15/16
[52] U.S. Cl. ..................... 350/427; 350/423
[58] Field of Search ................. 350/423, 427

[56] References Cited

U.S. PATENT DOCUMENTS

| | | | |
|---|---|---|---|
| 4,172,635 | 10/1979 | Ogino | 350/426 |
| 4,348,082 | 9/1982 | Ogawa | 350/423 |
| 4,462,664 | 7/1984 | Moskovich | |
| 4,478,496 | 10/1984 | Kato | 350/427 |
| 4,629,294 | 12/1986 | Tanaka et al. | 350/427 |
| 4,639,096 | 1/1987 | Kitagishi | 350/427 |
| 4,650,291 | 3/1987 | Kato | 350/427 |
| 4,687,303 | 8/1987 | Takahashi et al. | 350/427 |
| 4,699,475 | 10/1987 | Takahashi et al. | 350/427 |
| 4,729,643 | 3/1988 | Kawaguchi et al. | 350/427 |

FOREIGN PATENT DOCUMENTS

| | | |
|---|---|---|
| 48-32740 | 10/1973 | Japan . |
| 53-131852 | 11/1978 | Japan . |
| 56-42208 | 4/1981 | Japan . |
| 57-111507 | 7/1982 | Japan . |
| 57-172310 | 10/1982 | Japan . |
| 58-199313 | 11/1983 | Japan . |
| 60-36568 | 8/1985 | Japan . |

*Primary Examiner*—John K. Corbin
*Assistant Examiner*—Ronald M. Kachmarik
*Attorney, Agent, or Firm*—Cushman, Darby & Cushman

[57] ABSTRACT

A telephoto zoom lens system comprising a first lens group having positive refractive power, a second lens group having negative refractive power, and a third lens group comprising a front subgroup, which has positive refractive power, and a rear subgroup, the telephoto zoom lens system being arranged that the focal length thereof is varied by moving the first, second and third lens groups along the optical axis in the state that the varifocal functions is alloted to the second and third lens groups so that the magnifications of both of them increase at that time, the telephoto zoom lens system being thereby arranged to be small in size, high-performanced and low cost.

15 Claims, 20 Drawing Sheets

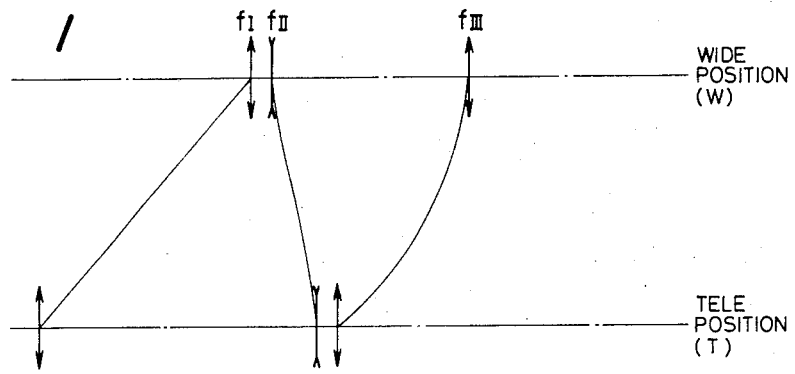
FIG. 1
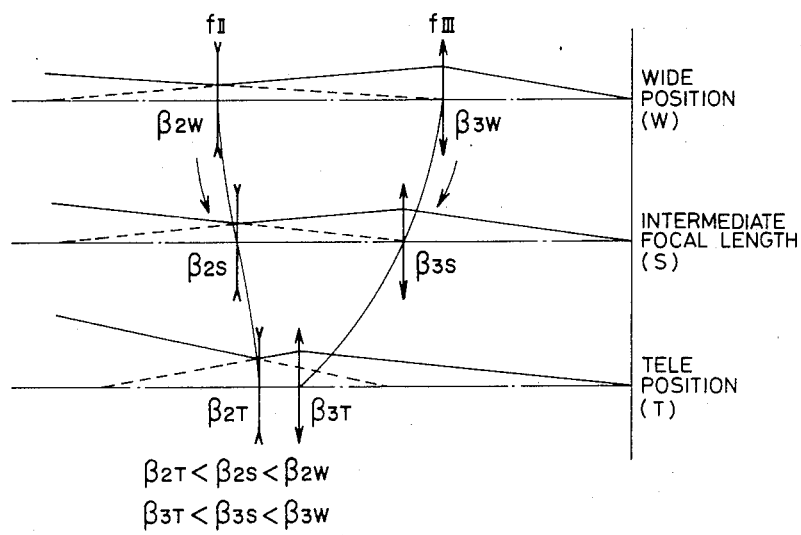
FIG. 2
$\beta_{2T} < \beta_{2S} < \beta_{2W}$
$\beta_{3T} < \beta_{3S} < \beta_{3W}$
FIG. 3
PRIOR ART
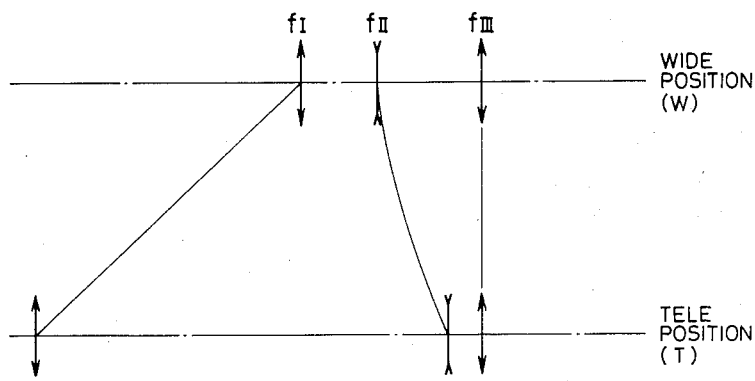

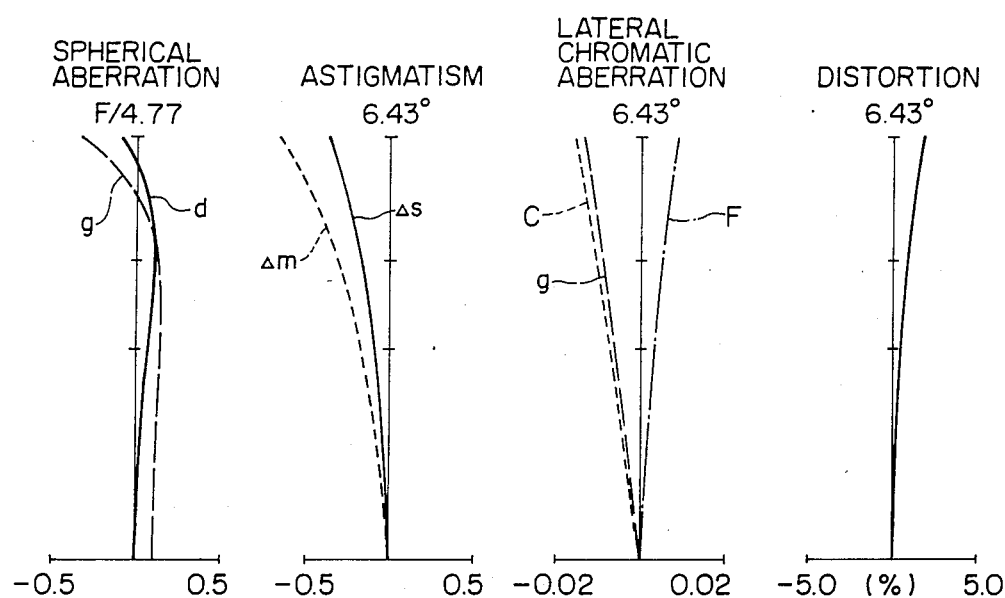

TELEPHOTO ZOOM LENS SYSTEM

BACKGROUND OF THE INVENTION (a) Field of the Invention

The present invention relates to a telephoto zoom lens system.

(b) Description of the Prior Art

There are many known telephoto zoom lens systems whose field angle in the wide position is 30° to 38° and zoom ratio is about 3. Out of said type of zoom lens system, typical ones are disclosed in Japanese published unexamined patent applications No. 131852/78, No. 42208/81, etc. The known zoom lens systems disclosed in said patent applications respectively comprise four lens groups, i.e., a positive lens group, negative lens group, a positive lens group and a positive lens group. Said known zoom lens systems have the following featurs, i.e., each of them is arranged as a lens system wherein the first up to the third lens groups constitute a vari-focal system and the fourth lens group which serves as an imaging lens is arranged in rear of said vari-focal system and wherein respective lens groups have functions independent of each other, said known zoom lens systems being typical of telephoto zoom lens systems.

On the other hand, as zoom lens systems quickly come into wide use in these years, there is a strong demand for a zoom lens system with high portability and operability including a smaller size and lighter weight and, moreover, at a lower price.

Under such circumstances, in order to make the lens system small in size, telephoto zoom lens systems are being arranged that the vari-focal system and imaging lens have strong refractive powers, and this causes aggravation of aberrations, for example, which are undesirable for telephoto type lens systems. As a result, the performance of the lens system decreases and it is difficult to obtain satisfactorily favourable performance over the whole range of focal length of the lens system. Therefore, it is said that the telephoto ratio about 0.9 is the limit which can be attained when trying to make a telephoto zoom lens system small in size.

Besides the known zoom lens systems comprising four lens group for which it is tried to make the lens system small in size by arranging that the vari-focal system and imaging lens thereof have strong refractive powers as described in the above, there are known zoom lens systems which are made small in size by another method, i.e., by adopting a type of zooming with which the overall length of the lens system becomes short. Said type of zooming was widely adopted for zoom lens systems for 8 mm cinecameras. The zoom lens systems disclosed in Japanese published examined patent application No. 32740/73, Japanese published unexamined patent applications No. 172310/82 and No. 199313/83, etc. are known as the zoom lens systems wherein said type of zooming is applied to photographic lens systems for 35 mm cameras. Said known zoom lens systems are arranged to comprise three lens groups and are arranged that the first and second lens groups thereof constitute a vari-focal system and that the third lens group thereof, which is located in rear of the vari-focal system, is kept fixed in respect to the image surface at the time of zooming and is used as an imaging lens.

The zoom lens systems wherein said type of zooming is adopted have advantages that the lens system can be made satisfactorily small in size in the wide position and that the cost of production can be made low because the number of lenses constituting the lens system can be made comparatively small.

However, said known zoom lens systems have a disadvantage that the optical performance is not satisfactorily stable. It seems that the above-mentioned disadvantage is due to the character inherent to said type of zooming. That is, to make the overall length of the lens system short in the wide position and to maintain the zoom ratio as about 3 at the same time, it is necessary to make the distance between the second and third lens groups short in the wide position by making the refractive power of the second lens group strong in the state that the refractive power of the first lens group is made weak and, moreover, to distribute refractive powers to respective lens groups so that the amount of movement of the second lens group at the time of zooming becomes small. Therefore, to obtain the desired zoom ratio, it is unavoidable to make the amount of movement of the first lens group at the time of zooming large. As the aperture stop of said lens system is located in the third lens group which is kept fixed at the time of zooming and of which the imaging magnification is approximately constant, the distance from the front surface of the lens system to the entrance pupil becomes long when the lens system is zoomed from the wide position to the teleposition by moving the first lens group largely. As a result, the variation of aberrations at the time of zooming becomes conspicuous. To say concretely, considerably undercorrected astigmatism and considerable pincushion distortion remain in the teleposition, there is a tendency that the intensity of light in the marginal portion becomes insufficient in the range of intermediate focal length to the telephoto range, and it is difficult to photograph an object at a satisfactorily sort distance. Besides, when it is tried to make the aperture ratio large, heights of paraxial rays become high when passing the second and third lens groups and it becomes difficult to correct aberrations as well as spherical aberration. Therefore, it is difficult to make the aperture ratio larger than about 1:4.5.

SUMMARY OF THE INVENTION

It is, therefore, a primary object of the present invention to provide a telephoto zoom lens system which is small in size, favourable in performance and low in cost.

The telephoto zoom lens system according to the present invention is arranged to attain the object by selecting an adequate type of zooming and adequate distribution of refractive powers.

The telephoto zoom lens system according to the present invention comprises, in the order from the object side, a first lens group I having positive refractive power, a second lens group II having negative refractive power, and a third lens group III having positive refractive power as shown in FIG. 1, wherein said third lens group III comprises a front subgroup IIIa having positive refractive power and a rear subgroup IIIb having positive or negative refractive power, said telephoto zoom lens system being arranged to be zoomed by moving the first lens group I, second lens group II and third lens group III respectively along the optical axis, said telephoto zoom lens system being arranged that the vari-focal function is alloted to the second lens group II and third lens group III so that the magnifications of both of the second and third lens groups simultaneously increase when the second and third lens groups are respectively moved along the optical axis at the time of zooming as above. Besides, the telephoto zoom lens system according to the present invention is arranged to fulfill the conditions (1) through (4) shown below:

$$0.6 < |\beta_{2T}| < 0.95 \tag{1}$$

$$1.0 < |\beta_{3T}| \tag{2}$$

$$0.9 < f_1/\sqrt{f_W \cdot f_T} < 1.3 \tag{3}$$

$$0.2 < |f_2|/\sqrt{f_W \cdot f_T} < 0.45 \tag{4}$$

where, reference symbols $\beta_{2T}$ and $\beta_{3T}$ respectively represent magnifications of the second lens group II and third lens group III in the teleposition, reference symbols $f_1$ and $f_2$ respectively represent focal lengths of the first lens group I and second lens group II, and reference symbols $f_W$ and $f_T$ respectively represent focal lengths of the lens system as a whole in the wide position and teleposition.

The basic composition of the telephoto zoom lens system according to the present invention is as shown in FIGS. 1 and 2 and, at the time of zooming, respective lens groups are moved as shown in said figures.

In case of the known zoom lens systems disclosed in the afore-mentioned patent applications each comprising three lens groups, the lens system comprises a first and second lens groups I and II which constitute a vari-focal system and a third lens group III which constitutes an imaging lens as shown in FIG. 3. Out of those lens groups, the imaging magnification of the third lens group III remains approximately constant at the time of zooming. Therefore, when it is attempted to obtain a desired zoom ratio, about 3 for example, the amount of movement of the first lens group I necessarily becomes very large at the time of zooming even in case that the amount of movement of the second lens group II at the time of zooming is made small by making the refractive power of the second lens group II strong.

FIG. 1 shows the typical movements of respective lens groups in the telephoto zoom lens system according to the present invention at the time of zooming. That is, at the time of zooming from the wide position to the teleposition, the first lens group I moves approximately linearly while the second lens group II moves toward the image side and the third lens group III moves toward the object side in the state that the second lens group II and the third lens group III respectively bear the magnification-increasing functions (the function that the magnification of the lens group increases). Here, FIG. 2 shows the states of movements at that time of the second lens group II and the third lens group III which substantially have the varifocal functions.

In case of the telephoto zoom lens system accroding to the present invention, the third lens group III also has the magnification-increasing function at the time of zooming. Therefore, the vari-focal function is efficiently alloted to respective lens groups, and it is not only possible to easily shorten the overall length of the lens system in the wide position but also possible to easily limit the telephoto ratio in the teleposition to the same degree as the telephoto ratio of the known zoom lens systems comprising four lens groups. As a result, the distance from the front surface of the lens system to the entrance pupil does not become so long even in the teleposition, and the overall length of the lens system becomes extremely short in the wide position and long in the teleposition. Therefore, it is possible to limit the telephoto ratio at each focal length to the necessary and sufficient degree and, moreover, it is advantageous for correction of aberrations.

Besides, at the time of zooming from the wide position to the teleposition, the second lens group II moves toward the image side and approaches the third lens group III. This fact has an effect that the width of diverging rays, which come out from the second lens group II and enter the third lens group III, does not become wider than required and that the effective diameter of the aperture stop located in the third lens group III is prevented from becoming larger than required.

Furthermore, the third lens group III relays the image point, which moves according to the movement of the second lens group II, as the object point of the third lens group III and moves so that the image point of the third lens group III, i.e., the image surface of the lens system, does not vary and, at the same time, the third lens group III has the magnification-increasing function.

To materialize a telephoto zoom lens system which makes it possible to attain the object of the present invention by arranging that respective lens groups have the functions described so far, it is necessary to arrange that the lens system fulfills the conditions (1) through (4) shown before.

The condition (1) defines the imaging magnification of the second lens group II in the teleposition and, in short, it means to select the vari-focal range of the magnifications smaller than $1\times$. If $|\beta_{2T}|$ is made smaller than the lower limit of the condition (1), it follows that the low-magnification side of the vari-focal range of the second lens group II is used and, consequently, the amount of movement of the third lens group III increases at the time of zooming from the wide position to the teleposition. As a result, it is necessary to make the refractive power of the first lens group I weak also for maintaining correction of aberrations in well balanced state in the zooming range and, consequently, the amount of movement of the first lens group I becomes large at the time of zooming. Therefore, as the lens system as a whole, the amounts of movement at the time of zooming become large, the overall length of the lens system becomes long in the teleposition, and it is impossible to attain the object of the present invention.

When $|\beta_{2T}|$ is made larger than the upper limit of the condition (1), the imaging magnification to be alloted to the third lens group III becomes small and the amount of movement of the third lens group III also becomes small. However, the imaging magnification $\beta_{2T}$ of the second lens group II in the teleposition becomes $1\times$ or larger than $1\times$. In the area near the imaging magnification $1\times$, the variation of the imaging magnification is large though the amount of movement of the second lens group II is small. Therefore, the required accuracy of the cam becomes strict, and this is not preferable for practical use. This is not preferable also from the view point of operability because, for example, the torque of the cam at the time of zooming becomes irregular in the teleposition.

The condition (2) is needed in order to obtain the desired zoom ratio for the telephoto zoom lens system according to the present invention. If $|\beta_{3T}|$ is made smaller than the lower limit of the condition (2), it is necessary to make the vari-focal range of the second lens group II large. As a result, the imaging magnification $\beta_{2i}$ of the second lens group II becomes larger than $1\times$ and, moreover, the amount of movement of the second lens group II at the time of zooming becomes large. Therefore, it is difficult to make the lens system small in the wide position. Besides, though it is possible to make the amount of movement of the second lens group II small by making the refractive power of the second lens group II strong, it is difficult to correct aberrations in that case.

The condition (3) relates to distribution of refractive power to the first lens group I. If the value defined by the condition (3) is made smaller than the lower limit thereof, it becomes difficult to fulfill the condition (1) or, when it is attempted to maintain the imaging magnification $|\beta_{2T}|$ in the range defined by the condition (1), it is unavoidable to make the refractive power of the second lens group II as a whole strong. In that case, it is unavoidable to increase the number of lenses constituting the second lens group II or to make the errors in the manufacture including decentering small and, consequently, it is impossible to obtain a telephoto zoom lens system at a low cost.

When the value defined by the condition (3) is made larger than the upper limit thereof, the refractive power of the first lens group as a whole becomes weak, and this is preferable for correction of aberrations. However, the amount of movement of the first lens group at the time of zooming becomes large and, when it is attempted to make the lens system small to some degree, the shortest photographable distance becomes long or the intensity of light in the marginal portion decreases.

The condition (4) relates to the refractive power of the second lens group II and it is needed in order to favourably correct aberrations over the whole zooming range. If the value defined by the condition (4) is made smaller than the lower limit thereof, the refractive power of the second lens group II becomes too strong, variation of aberrations becomes large when the focal length is varied, and influence of errors in the manufacture becomes large. When the value defined by the condition (4) is made larger than the upper limit thereof, it is advantageous for correction of aberrations. However, when it is attempted to maintain the desired zoom ratio, the amount of movement of the second lens group II becomes large, and it is necessary to avoid mechanical interference between the second lens group II and third lens group III. This is not desirable for making the lens system small and is contrary to the object of the present invention.

The telephoto zoom lens system having the basic composition shown before and fulfilling the respective conditions described so far makes it possible to attain the object of the present invention. However, the telephoto zoom lens system according to the present invention materializes a telephoto zoom lens system having still higher performance by arranging respective lens groups thereof as described below.

The telephoto zoom lens system according to the present invention is arranged that the first lens group I comprises at least one lens with positive refractive power and at least one lens with negative refractive power, the second lens group II comprises a first lens $L_1$ with negative refractive power, a second lens $L_2$ with negative refractive power, a third lens $L_3$ with positive refractive power and a fourth lens $L_4$ with negative refractive power in the order from the object side, and the third lens group III comprises a front subgroup IIIa and a rear subgroup IIIb wherein the front subgroup IIIa comprises a lens with positive refractive power, a lens with positive refractive power, a lens with negative refractive power and a lens with positive refractive power, and the rear subgroup IIIb comprises at least one lens with positive refractive power and at least one lens with negative refractive power, the telephoto zoom lens system according to the present invention being arranged to fulfill the conditions (5), (6) and (7) shown below so as to thereby materialize a more favourable telephoto zoom lens system:

$$1.6 < \overline{N}_2 < 1.85 \quad (5)$$

$$0.5 < f_{3a}/f_3 < 2.5 \quad (6)$$

$$1.6 < N_{3a} \quad (7)$$

where, reference symbol $\overline{N}_2$ represents the arithmetic mean of refractive indices of the lenses with negative refractive powers constituting the second lens group, reference symbol $N_{3a}$ represents the refractive index of the lens with positive refractive power located on the object side in the front subgroup IIIa of the third lens group III, reference symbol $f_{3a}$ represents the focal length of the front subgroup of the third lens group III, and reference symbol $f_3$ represents the focal length of the third lens group.

Now, the reason why correction of aberrations of the lens system becomes easier when the above-mentioned lens composition is adopted is described below. That is, the content of the telephoto zoom lens system according to the present invention is described in further detail below referring, for example, to the telephoto zoom lens system having the lens configuration shown in FIG. 4.

In the telephoto zoom lens system shown in FIG. 4, the first lens group I comprises a cemented doublet which consists of a lens with negative refractive power and a lens with positive refractive power. Said first lens group I is characterized in that it is arranged to comprise only one doublet by adopting the afore-mentioned distribution of refractive power on the contrary to the fact that the first lens group of known zoom lens systems comprises three lenses, i.e., a positive lens and a doublet. That is, by arranging that aberrations to be caused by the first lens group I is limited to an adequate degree, it is arranged that correction of aberrations by the lenses located in rear of the first lens group I becomes easy. By the above-mentioned arrangement, it is possible to reduce the cost of the first lens group I comprising lenses with large diameters which has accounted for a large percentage in the cost of known zoom lens systems, and this largely contributes to cost reduction of the lens system as a whole. When it is allowable from the view point of cost, it is perferable to use a glass material with anomalous dispersion for a lens in the first lens group I and/or to arrange that the first lens group I comprises three lenses.

Here, description is given below on the configuration of the second lens group II which has an important function in correction of aberrations of the telephoto zoom lens system according to the present invention. The second lens group II comprises two lenses $L_1$ and $L_2$ respectively having negative refractive powers, a biconvex lens $L_3$ and a lens $L_4$ with negative refractive power as described before. Out of them, the lenses $L_1$ and $L_2$ have functions to reduce the variation of astigmatism and distortion to be caused at the time of zooming. The lens $L_3$ has the function to correct spherical aberration, coma and chromatic aberration without causing influence on astigmatism and distortion. Especially, deviation of spherical aberration depending on the wavelength can be corrected favourably because the lens $L_3$ is a biconvex lens and, therefore, refractive power is distributed to both surfaces thereof.

In many of known zoom lens systems, the second lens group is arranged to comprise a negative lens, a negative lens, a positive or negative lens, a positive lens, and a negative lens in the order from the object side. However, zoom lens systems in which the second lens group has the above-mentioned lens configuration cause considerably overcorrected chromatic aberration of higher order in the wide position.

In case of the telephoto zoom lens system according to the present invention, the second lens group II is arranged to have the lens configuration described before and, therefore, the above-mentioned disadvantage of known zoom lens systems is eliminated. Besides, by arranging an air lens in the second lens group II and thereby providing surfaces which cause aberrations of higher order, it is possible to arrange that said surfaces much contribute to correction of spherical aberration, which is directly related chiefly to paraxial rays of which heights of incidence are high in the second lens group II, over the whole zooming range. Said surfaces correspond, for example, to the seventh and eighth surfaces of Embodiment 1 shown later, and said surfaces and the airspace (air lens) between them have the above-mentioned function. This will be evident from aberration coefficients of the third order of Emboidment 1 shown later. Furthermore, for the second lens group II having the afore-mentioned lens configuration, it is also possible to integrally cement all of the lenses $L_1$, $L_2$, $L_3$ and $L_4$ together so as to form a cemented lens. In that case, however, it is difficult to correct spherical aberration. Therefore, in the telephoto zoom lens system according to the present invention, the second lens group II is formed by arranging all of said lenses as single lenses which are independent of each other or by cementing some two of them so as to form a cemented doublet as illustrated by respective embodiments shown later. Here, when the lenses $L_2$ and $L_3$ are cemented together so as to form a cemented doublet as illustrated by Embodiment 3, it is possible to correct aberrations as a whole favourably through spherical aberration of higher order to be caused becemes small. Furthermore, when the second lens group is arranged to comprise a first lens $L_1$ with negative refractive power, a second lens $L_2$ with positive refractive power, a third lens $L_3$ with negative refractive power, and a fourth lens $L_4$ with negative refractive power in the order from the object side as illustrative by Embodiment 5, it is possible to arrange that aberrations caused by respective lenses are offset each other though the amounts of said aberrations caused by respective lenses become somewhat large and, therefore, it is possible to correct aberrations as a whole favorably.

The condition (5) relates to the second lens group II. When $\overline{N}_2$ is made smaller than the lower limit of the condition (5), curvature of each lens surface in the second lens group II become strong. As a result, variation of chromatic aberration and other aberrations occurs at the time of zooming, and it is difficult to correct aberrations favourably over the whole zooming range. When $\overline{N}_2$ is made larger than the upper limit of the condition (5), it is advantageous for correction of curvature of field. However, there is a tendency that longitudinal chromatic aberration and lateral chromatic aberration become large, and this is not desirable. To make the secondary spectrum small here, it is preferable to adopt a combination of glass materials each with anomalous dispersion, for example, for the lens $L_3$ having positive refractive power and the lens $L_4$ having negative refractive power.

Now, the third lens group III is an imaging lens having a magnification-increasing function and focal point compensating function and comprises a front subgroup IIIa having positive refractive power and a rear subgroup IIIb having negative or positive refractive power, i.e., the third lens group III is formed into a type that resembles the so-called telephoto type.

For the third lens group III, it is preferable to adopt a lens configuration with which the front focal point is shifted as far as possible toward the object side because it is then convenient also for making the telephoto ratio of the third lens group III itself small. Besides, for making the lens system small, it is preferable to adopt the lens configurations of the second lens group II which are adopted especially in respective embodiments of the present invention because the rear principal point comes to a position comparatively close to the object side.

Said third lens group III is arranged that, as illustrated by Embodiment 1 (FIG. 4), the front subgroup IIIa comprises a lens with positive refractive power, a cemented doublet consisting of a lens with positive refractive power and a lens with negative refractive power, and a meniscus lens with positive refractive power in the order from the object side, and the rear subgroup IIIb comprises a biconvex lens having positive refractive power, and a meniscus lens having negative refractive power, so that satisfactory favourable performance is thereby obtained. Besides, it is possible to correct aberrations satisfactorily favourably also when the front subgroup IIIa is arranged to comprise a lens with positive refractive power, a lens with positive refractive power, and a cemented doublet consisting of a lens with positive refractive power and a lens with negative refractive power as illustrated by Embodiment 7. The latter arrangement shown in the above is suitable also for making the telephote ratio of the third lens group III itself small.

The condition (6) defines distribution of refractive power in the third lens group III having the lens configuration described in the above and is required for obtaining a telephoto ratio, which is necessary and sufficient for making the overall length of the third lens group III short, and for thereby ensuring favourable performance.

When $f_{3a}/f_3$ becomes smaller than the lower limit of the condition (6), Petzval's sum becomes a negative value with a large absolute value and, therefore, curvature of field will be overcorrected. Besides, astigmatism becomes large and, at the same time, zonal aberration also becomes large. When $f_{3a}/f_3$ becomes larger than the upper limit of the condition (6), it is advantageous for correction of aberrations. However, it is difficult to obtain the desired telephote ratio, and this is contrary to the object of the present invention.

The condition (7) defines the refractive index of the lens with positive refractive power which is located on the object side in the front subgroup IIIa of the third lens group III. When the condition (7) is not fulfilled, i.e., when a glass material with a refractive index lower than the value defined by the condition (7) is used for said lens, curvature of the surface on the object side of said lens becomes strong. As a result, also due to the fact that incident heights of diverging paraxial rays coming from the second lens group II become very high on said surface, spherical aberration tends to be undercorrected and, as to spherical aberration as a whole, zomal spherical aberration becomes large. At the same time, coma flare becomes conspicuous. Moreover, as the above-mentioned tendency becomes stronger toward the teleposition, decrease of imaging performance will be caused, and this is not desirable.

The telephoto zoom lens system according to the present invention comprises three lens groups and is arranged to be zoomed by moving said lens group independently of each other as described before. As a special case, however, it is also possible to adopt such zooming method that the second lens group II is arranged as a fixed lens group or that the first lens group I and the third lens group III are moved integrally. However, for keeping a high degree of freedom for correction of aberrations and, especially, for maintaining astigmatism and spherical aberration in well balanced state at the time of zooming, the zooming method adopted in the present invention is extremely effective. Besides, by improving the structure of lens mount and by improving the cam mechanism for zooming, it is possible to materialize an excellent telephote zoom lens system by means of the present invention at the same degree of cost as known zoom lens systems comprising three lens groups.

BRIEF DESCRIPTION OF THE DRAWINGS

FIG. 1 shows the basic composition of the telephoto zoom lens system according to the present invention;

FIG. 2 shows the state of movement of the second lens group II and the third lens group III of the telephoto zoom lens system according to the present invention;

FIG. 3 shows the basic composition of known zoom lens systems comprising three lens groups;

FIGS. 21A, 21B and 21C respectively show graphs illustrating aberration curves of Embodiment 9.

DETAILED DESCRIPTION OF THE PREFERRED EMBODIMENTS

Figure 4:
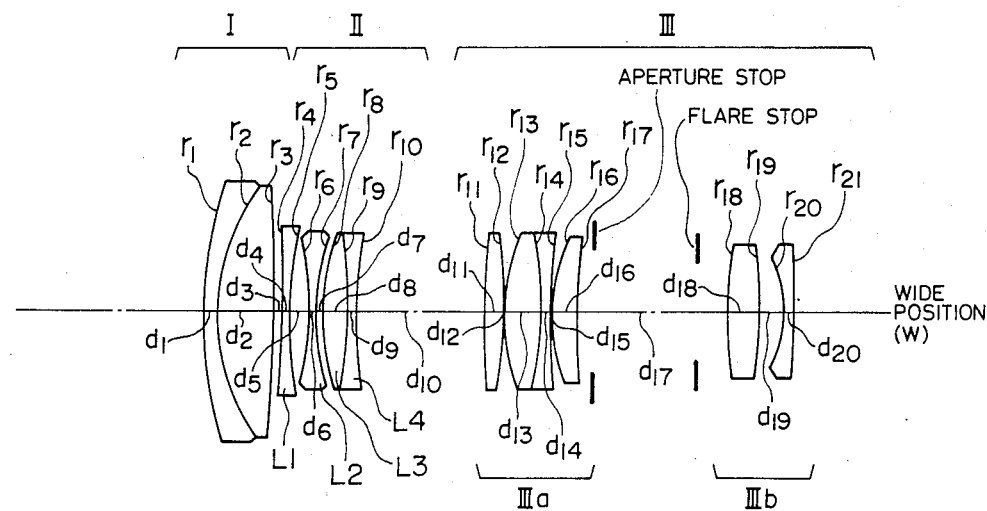
FIG. 4 shows a sectional view of Embodiment 1 of the telephoto zoom lens system according to the present invention in the wide position, position of intermediate focal length, and teleposition.
Figure 4:
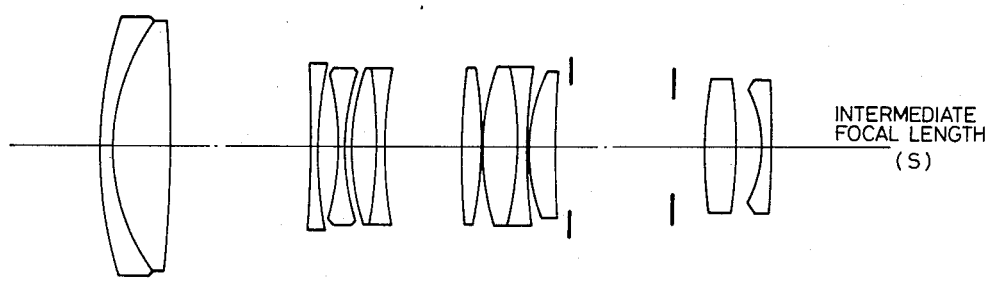
Figure 4:
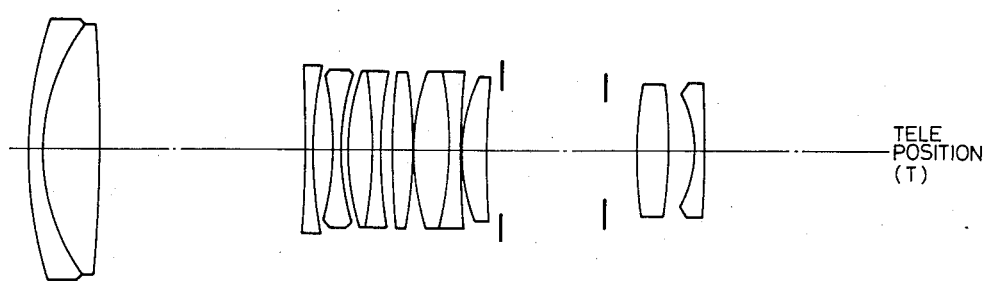

Now, preferred embodiments of the telephoto zoom lens system described so far are shown below.

Embodiment 1
$f = 72.36 \sim 192.74$, F $3.63 \sim 4.76$ $r_1 = 83.878$
$d_1 = 2.75$, $n_1 = 1.7618$, $\nu_1 = 27.11$
$r_2 = 44.922$
$d_2 = 11.21$, $n_2 = 1.61484$, $\nu_2 = 51.71$
$r_3 = -323.79$
$d_3 = D_1$
$r_4 = -221.601$
$d_4 = 1.95$, $n_3 = 1.79952$, $\nu_3 = 42.24$
$r_5 = 103.684$
$d_5 = 3.44$
$r_6 = -64.073$
$d_6 = 1.72$, $n_4 = 1.713$, $\nu_4 = 53.84$
$r_7 = 53.652$
$d_7 = 1.45$
$r_8 = 51.509$
$d_8 = 4.88$, $n_5 = 1.80518$, $\nu_5 = 25.43$
$r_9 = -114.788$
$d_9 = 1.88$, $n_6 = 1.7725$, $\nu_6 = 49.66$
$r_{10} = 110.017$
$d_{10} = D_2$
$r_{11} = 184.354$
$d_{11} = 4.0$, $n_7 = 1.713$, $\nu_7 = 53.84$
$r_{12} = -94.813$
$d_{12} = 0.1$
$r_{13} = 50.139$
$d_{13} = 7.5$, $n_8 = 1.51633$, $\nu_8 = 64.15$
$r_{14} = -63.637$
$d_{14} = 1.89$, $n_9 = 1.7847$, $\nu_9 = 26.22$
$r_{15} = 144.542$
$d_{15} = 0.3$
$r_{16} = 37.545$
$d_{16} = 5.2$, $n_{10} = 1.51633$, $\nu_{10} = 64.15$
$r_{17} = 145.782$
$d_{17} = 29.41$
$r_{18} = 70.856$
$d_{18} = 7.01$, $n_{11} = 1.60717$, $\nu_{11} = 40.26$
$r_{19} = -86.213$
$d_{19} = 5.09$
$r_{20} = -26.892$
$d_{20} = 1.7$, $n_{12} = 1.7725$, $\nu_{12} = 49.66$
$r_{21} = -153.366$

| f | 72.36 | 118.034 | 192.74 |
|---|---|---|---|
| $D_1$ | 1.66 | 29.11 | 41.74 |
| $D_2$ | 24.91 | 14.47 | 1.5 |

$\beta_{2T} = -0.857$, $\beta_{3T} = -1.721$, $f_1/\sqrt{f_W \cdot f_T} = 1.107$ $|f_2|/\sqrt{f_W \cdot f_T} = 0.306$, $\overline{N_2} = \dfrac{n_3 + n_4 + n_6}{3} = 1.762$ $f_{3a}/f_3 = 1.153$, $N_{3a} = n_7 = 1.713$ Embodiment 2
$f = 72.43 \sim 193.2$, F $3.63 \sim 4.77$ $r_1 = 84.247$
$d_1 = 2.75$, $n_1 = 1.7618$, $\nu_1 = 27.11$
$r_2 = 44.983$
$d_2 = 11.22$, $n_2 = 1.61484$, $\nu_2 = 51.17$
$r_3 = -317.8$
$d_3 = D_1$
$r_4 = -223.978$
$d_4 = 1.93$, $n_3 = 1.79952$, $\nu_3 = 42.24$
$r_5 = 108.014$
$d_5 = 2.59$
$r_6 = -63.567$
$d_6 = 1.7$, $n_4 = 1.713$, $\nu_4 = 53.84$
$r_7 = 53.561$
$d_7 = 1.45$ -continued

Embodiment 2
$f = 72.43 \sim 193.2$, F $3.63 \sim 4.77$

| | | | |
|---|---|---|---|
| $r_8 = 51.086$ | | | |
| $d_8 = 4.78$ | | $n_5 = 1.78472$ | $\nu_5 = 25.68$ |
| $r_9 = -109.47$ | | | |
| $d_9 = 1.0$ | | | |
| $r_{10} = -112.818$ | | | |
| $d_{10} = 2.03$ | | $n_6 = 1.7725$ | $\nu_6 = 49.66$ |
| $r_{11} = 110.794$ | | | |
| $d_{11} = D_2$ | | | |
| $r_{12} = 182.968$ | | | |
| $d_{12} = 3.97$ | | $n_7 = 1.713$ | $\nu_7 = 53.84$ |
| $r_{13} = -96.002$ | | | |
| $d_{13} = 0.1$ | | | |
| $r_{14} = 49.847$ | | | |
| $d_{14} = 7.56$ | | $n_8 = 1.51633$ | $\nu_8 = 64.15$ |
| $r_{15} = -65.388$ | | | |
| $d_{15} = 1.88$ | | $n_9 = 1.78472$ | $\nu_9 = 25.71$ |
| $r_{16} = 151.999$ | | | |
| $d_{16} = 0.3$ | | | |
| $r_{17} = 37.734$ | | | |
| $d_{17} = 5.2$ | | $n_{10} = 1.51633$ | $\nu_{10} = 64.15$ |
| $r_{18} = 139.1$ | | | |
| $d_{18} = 29.41$ | | | |
| $r_{19} = 71.29$ | | | |
| $d_{19} = 6.97$ | | $n_{11} = 1.60342$ | $\nu_{11} = 38.01$ |
| $r_{20} = -86.764$ | | | |
| $d_{20} = 5.09$ | | | |
| $r_{21} = -26.785$ | | | |
| $d_{21} = 1.7$ | | $n_{12} = 1.7725$ | $\nu_{12} = 49.66$ |
| $r_{22} = -157.126$ | | | |
| f | 72.43 | 118.25 | 193.2 |
| $D_1$ | 1.66 | 29.12 | 41.74 |
| $D_2$ | 24.92 | 14.46 | 1.5 |

$\beta_{2T} = -0.858$, $\beta_{3T} = -1.722$, $f_1/\sqrt{f_W \cdot f_T} = 1.105$ $|f_2|/\sqrt{f_W \cdot f_T} = 1.155$, $\overline{N}_2 = 1.762$ $f_{3a}/f_3 = 1.155$, $N_{3a} = 1.713$

Embodiment 3
$f = 72.36 \sim 192.75$, F $3.63 \sim 4.76$

| | | | |
|---|---|---|---|
| $r_1 = 84.454$ | | | |
| $d_1 = 2.79$ | | $n_1 = 1.7618$ | $\nu_1 = 27.11$ |
| $r_2 = 44.742$ | | | |
| $d_2 = 11.52$ | | $n_2 = 1.61484$ | $\nu_2 = 51.17$ |
| $r_3 = -302.267$ | | | |
| $d_3 = D_1$ | | | |
| $r_4 = -191.874$ | | | |
| $d_4 = 2.22$ | | $n_3 = 1.8061$ | $\nu_3 = 40.95$ |
| $r_5 = 92.941$ | | | |
| $d_5 = 3.54$ | | | |
| $r_6 = -58.921$ | | | |
| $d_6 = 1.75$ | | $n_4 = 1.691$ | $\nu_4 = 54.84$ |
| $r_7 = 40.960$ | | | |
| $d_7 = 4.89$ | | $n_5 = 1.80518$ | $\nu_5 = 25.43$ |
| $r_8 = -179.977$ | | | |
| $d_8 = 2.09$ | | | |
| $r_9 = -149.759$ | | | |
| $d_9 = 1.7$ | | $n_6 = 1.7725$ | $\nu_6 = 49.66$ |
| $r_{10} = 202.1$ | | | |
| $d_{10} = D_2$ | | | |
| $r_{11} = 207.561$ | | | |
| $d_{11} = 3.59$ | | $n_7 = 1.741$ | $\nu_7 = 52.68$ |
| $r_{12} = -95.254$ | | | |
| $d_{12} = 0.1$ | | | |
| $r_{13} = 52.147$ | | | |
| $d_{13} = 6.75$ | | $n_8 = 1.51633$ | $\nu_8 = 64.15$ |
| $r_{14} = -60.379$ | | | |
| $d_{14} = 1.99$ | | $n_9 = 1.7847$ | $\nu_9 = 26.22$ |
| $r_{15} = 156.566$ | | | |
| $d_{15} = 0.32$ | | | |
| $r_{16} = 36.682$ | | | |
| $d_{16} = 4.81$ | | $n_{10} = 1.51633$ | $\nu_{10} = 64.15$ |
| $r_{17} = 148.45$ | | | |

-continued

Embodiment 3
$f = 72.36 \sim 192.75$, F $3.63 \sim 4.76$

| | | | |
|---|---|---|---|
| $d_{17} = 29.48$ | | | |
| $r_{18} = 72.375$ | | | |
| $d_{18} = 6.66$ | | $n_{11} = 1.60342$ | $\nu_{11} = 38.01$ |
| $r_{19} = -76.106$ | | | |
| $d_{19} = 5.1$ | | | |
| $r_{20} = -26.885$ | | | |
| $d_{20} = 1.74$ | | $n_{12} = 1.7725$ | $\nu_{12} = 49.66$ |
| $r_{21} = -182.444$ | | | |
| f | 72.36 | 118.044 | 192.75 |
| $D_1$ | 1.83 | 29.12 | 41.77 |
| $D_2$ | 24.99 | 14.47 | 1.21 |

$\beta_{2T} = -0.884$, $\beta_{3T} = -1.681$ $f_1/\sqrt{f_W \cdot f_T} = 1.099$, $|f_2|/\sqrt{f_W \cdot f_T} = 0.305$ $\overline{N}_2 = 1.756$, $f_{3a}/f_3 = 1.149$, $N_{3a} = 1.741$

Embodiment 4
$f = 76.61 \sim 196.01$, F $3.63 \sim 4.77$

| | | | |
|---|---|---|---|
| $r_1 = 33.791$ | | | |
| $d_1 = 2.74$ | | $n_1 = 1.7618$ | $\nu_1 = 27.11$ |
| $r_2 = 44.907$ | | | |
| $d_2 = 11.18$ | | $n_2 = 1.61484$ | $\nu_2 = 51.17$ |
| $r_3 = -332.153$ | | | |
| $d_3 = D_1$ | | | |
| $r_4 = -245.866$ | | | |
| $d_4 = 1.9$ | | $n_3 = 1.79952$ | $\nu_3 = 42.24$ |
| $r_5 = 104.662$ | | | |
| $d_5 = 3.33$ | | | |
| $r_6 = -64.998$ | | | |
| $d_6 = 1.55$ | | $n_4 = 1.713$ | $\nu_4 = 53.84$ |
| $r_7 = 53.723$ | | | |
| $d_7 = 1.45$ | | | |
| $r_8 = 51.766$ | | | |
| $d_8 = 4.49$ | | $n_5 = 1.80518$ | $\nu_5 = 25.43$ |
| $r_9 = -120.489$ | | | |
| $d_9 = 1.55$ | | $n_6 = 1.7725$ | $\nu_6 = 49.66$ |
| $r_{10} = 112.072$ | | | |
| $d_{10} = D_2$ | | | |
| $r_{11} = 185.508$ | | | |
| $d_{11} = 3.47$ | | $n_7 = 1.713$ | $\nu_7 = 53.84$ |
| $r_{12} = -98.371$ | | | |
| $d_{12} = 0.02$ | | | |
| $r_{13} = 49.147$ | | | |
| $d_{13} = 7.09$ | | $n_8 = 1.51633$ | $\nu_8 = 64.15$ |
| $r_{14} = -65.532$ | | | |
| $d_{14} = 1.88$ | | $n_9 = 1.7847$ | $\nu_9 = 26.22$ |
| $r_{15} = 138.949$ | | | |
| $d_{15} = 0.3$ | | | |
| $r_{16} = 36.586$ | | | |
| $d_{16} = 4.92$ | | $n_{10} = 1.51633$ | $\nu_{10} = 64.15$ |
| $r_{17} = 160.651$ | | | |
| $d_{17} = 29.41$ | | | |
| $r_{18} = 78.472$ | | | |
| $d_{18} = 5.04$ | | $n_{11} = 1.60717$ | $\nu_{11} = 40.26$ |
| $r_{19} = -81.828$ | | | |
| $d_{19} = 5.10$ | | | |
| $r_{20} = -25.740$ | | | |
| $d_{20} = 1.70$ | | $n_{12} = 1.7725$ | $\nu_{12} = 49.66$ |
| $r_{21} = -425.4833$ | | | |
| $d_{21} = 1.2$ | | | |
| $r_{22} = 597.165$ | | | |
| $d_{22} = 3.0$ | | $n_{13} = 1.60717$ | $\nu_{13} = 40.26$ |
| $r_{23} = -257.886$ | | | |
| f | 76.61 | 121.44 | 196.01 |
| $D_1$ | 1.66 | 29.1 | 41.72 |
| $D_2$ | 24.85 | 14.77 | 1.50 |

$\beta_{2T} = -0.887$, $\beta_{3T} = -2.106$ $f_1/\sqrt{f_W \cdot f_T} = 1.072$, $|f_2|/\sqrt{f_W \cdot f_T} = 0.304$ $\overline{N}_2 = 1.762$, $f_{3a}/f_3 = 1.123$, $N_{3a} = 1.713$

| Embodiment 5 |
|---|
| $f = 72.33 \sim 192.74$, F $3.51 \sim 5.16$ |

| | | |
|---|---|---|
| $r_1 = 86.951$ | | |
| $d_1 = 2.55$ | $n_1 = 1.7552$ | $\nu_1 = 27.51$ |
| $r_2 = 44.172$ | | |
| $d_2 = 10.5$ | $n_2 = 1.61484$ | $\nu_2 = 51.17$ |
| $r_3 = -281.699$ | | |
| $d_3 = D_1$ | | |
| $r_4 = -82.6$ | | |
| $d_4 = 1.82$ | $n_3 = 1.713$ | $\nu_3 = 53.84$ |
| $r_5 = 81.394$ | | |
| $d_5 = 0.72$ | | |
| $r_6 = 116.637$ | | |
| $d_6 = 4.8$ | $n_4 = 1.7847$ | $\nu_4 = 26.22$ |
| $r_7 = -56.462$ | | |
| $d_7 = 0.176$ | | |
| $r_8 = -103.265$ | | |
| $d_8 = 1.7$ | $n_5 = 1.713$ | $\nu_5 = 53.84$ |
| $r_9 = 63.401$ | | |
| $d_9 = 3.91$ | | |
| $r_{10} = -36.151$ | | |
| $d_{10} = 1.7$ | $n_6 = 1.713$ | $\nu_6 = 53.84$ |
| $r_{11} = -83.899$ | | |
| $d_{11} = D_2$ | | |
| $r_{12} = -141.456$ | | |
| $d_{12} = 3.6$ | $n_7 = 1.713$ | $\nu_7 = 53.84$ |
| $r_{13} = -72.255$ | | |
| $d_{13} = 0.1$ | | |
| $r_{14} = 61.298$ | | |
| $d_{14} = 6.5$ | $n_8 = 1.51633$ | $\nu_8 = 64.15$ |
| $r_{15} = -39.630$ | | |
| $d_{15} = 1.8$ | $n_9 = 1.7847$ | $\nu_9 = 26.22$ |
| $r_{16} = -173.788$ | | |
| $d_{16} = 0.3$ | | |
| $r_{17} = 31.344$ | | |
| $d_{17} = 4.5$ | $n_{10} = 1.48749$ | $\nu_{10} = 70.2$ |
| $r_{18} = 105.675$ | | |
| $d_{18} = 29.41$ | | |
| $r_{19} = 59.322$ | | |
| $d_{19} = 6.0$ | $n_{11} = 1.61293$ | $\nu_{11} = 37.0$ |
| $r_{20} = -132.338$ | | |
| $d_{20} = 5.77$ | | |
| $r_{21} = -24.874$ | | |
| $d_{21} = 1.7$ | $n_{12} = 1.7725$ | $\nu_{12} = 49.66$ |
| $r_{22} = -96.444$ | | |

| f | 72.33 | 118.03 | 192.74 |
|---|---|---|---|
| $D_1$ | 2.01 | 25.27 | 38.02 |
| $D_2$ | 24.85 | 13.58 | 1.0 |

$\beta_{2T} = -0.502$, $\beta_{3T} = -1.924$ $f_1/\sqrt{f_W \cdot f_T} = 1.111$, $|f_2|/\sqrt{f_W \cdot f_T} = 0.31$ $\overline{N_2} = 1.713$, $f_{3a}/f_3 = 1.136$, $N_{3a} = 1.713$

| Embodiment 6 |
|---|
| $f = 72.45 \sim 202.64$, F $3.63 \sim 5.0$ |

| | | |
|---|---|---|
| $r_1 = 84.279$ | | |
| $d_1 = 2.58$ | $n_1 = 1.7618$ | $\nu_1 = 27.11$ |
| $r_2 = 45.557$ | | |
| $d_2 = 10.69$ | $n_2 = 1.61484$ | $\nu_2 = 51.17$ |
| $r_3 = -332.467$ | | |
| $d_3 = D_1$ | | |
| $r_4 = -578.645$ | | |
| $d_4 = 1.93$ | $n_3 = 1.79952$ | $\nu_3 = 42.24$ |
| $r_5 = 79.111$ | | |
| $d_5 = 3.05$ | | |
| $r_6 = -51.360$ | | |
| $d_6 = 1.7$ | $n_4 = 1.713$ | $\nu_4 = 53.84$ |
| $r_7 = 97.923$ | | |
| $d_7 = 1.45$ | | |
| $r_8 = 72.884$ | | |
| $d_8 = 4.78$ | $n_5 = 1.78472$ | $\nu_5 = 25.68$ |
| $r_9 = -61.927$ | | |
| $d_9 = 1.3$ | | |
| $r_{10} = -59.306$ | | |
| $d_{10} = 2.03$ | $n_6 = 1.7725$ | $\nu_6 = 49.66$ |
| $r_{11} = 134.616$ | | |

-continued

| Embodiment 6 |
|---|

| | | |
|---|---|---|
| $d_{11} = D_2$ | | |
| $r_{12} = -201.483$ | | |
| $d_{12} = 3.74$ | $n_7 = 1.713$ | $\nu_7 = 53.84$ |
| $r_{13} = -50.506$ | | |
| $d_{13} = 0.1$ | | |
| $r_{14} = 57.135$ | | |
| $d_{14} = 7.02$ | $n_8 = 1.51633$ | $\nu_8 = 64.15$ |
| $r_{15} = -48.734$ | | |
| $d_{15} = 1.88$ | $n_9 = 1.78472$ | $\nu_9 = 25.71$ |
| $r_{16} = -2648.602$ | | |
| $d_{16} = 0.3$ | | |
| $r_{17} = 28.927$ | | |
| $d_{17} = 5.26$ | $n_{10} = 1.51633$ | $\nu_{10} = 64.15$ |
| $r_{18} = 60.932$ | | |
| $d_{18} = 41.8$ | | |
| $r_{19} = -18.974$ | | |
| $d_{19} = 1.7$ | $n_{11} = 1.7725$ | $\nu_{11} = 49.66$ |
| $r_{20} = -36.121$ | | |
| $d_{20} = 0.5$ | | |
| $r_{21} = 1495.492$ | | |
| $d_{21} = 4.3$ | $n_{12} = 1.60342$ | $\nu_{12} = 38.01$ |
| $r_{22} = -54.786$ | | |

| f | 72.45 | 121.24 | 202.64 |
|---|---|---|---|
| $D_1$ | 1.5 | 30.63 | 42.4 |
| $D_2$ | 23.89 | 13.84 | 1.39 |

$\beta_{2T} = -0.787$, $\beta_{3T} = -1.96$ $f_1/\sqrt{f_W \cdot f_T} = 1.085$, $|f_2|/\sqrt{f_W \cdot f_T} = 0.284$ $\overline{N_2} = 1.762$, $f_{3a}/f_3 = 0.990$, $N_{3a} = 1.713$

| Embodiment 7 |
|---|
| $f = 72.36 \sim 192.74$, F $= 3.86 \sim 4.77$ |

| | | |
|---|---|---|
| $r_1 = 85.055$ | | |
| $d_1 = 2.75$ | $n_1 = 1.7618$ | $\nu_1 = 27.11$ |
| $r_2 = 47.14$ | | |
| $d_2 = 11.21$ | $n_2 = 1.6223$ | $\nu_2 = 53.2$ |
| $r_3 = -363.21$ | | |
| $d_3 = D_1$ | | |
| $r_4 = -148.302$ | | |
| $d_4 = 1.95$ | $n_3 = 1.7725$ | $\nu_3 = 49.66$ |
| $r_5 = 123.355$ | | |
| $d_5 = 2.75$ | | |
| $r_6 = -65.846$ | | |
| $d_6 = 1.72$ | $n_4 = 1.7432$ | $\nu_4 = 49.31$ |
| $r_7 = 107.711$ | | |
| $d_7 = 1.61$ | | |
| $r_8 = 57.916$ | | |
| $d_8 = 4.88$ | $n_5 = 1.80518$ | $\nu_5 = 25.43$ |
| $r_9 = -92.956$ | | |
| $d_9 = 1.88$ | $n_6 = 1.7725$ | $\nu_6 = 49.66$ |
| $r_{10} = 69.016$ | | |
| $d_{10} = D_2$ | | |
| $r_{11} = 101.531$ | | |
| $d_{11} = 4.62$ | $n_7 = 1.6968$ | $\nu_7 = 55.52$ |
| $r_{12} = -108.921$ | | |
| $d_{12} = 0.1$ | | |
| $r_{13} = 61.034$ | | |
| $d_{13} = 4.49$ | $n_8 = 1.55232$ | $\nu_8 = 63.75$ |
| $r_{14} = 404.848$ | | |
| $d_{14} = 0.1$ | | |
| $r_{15} = 34.416$ | | |
| $d_{15} = 6.36$ | $n_9 = 1.48749$ | $\nu_9 = 70.2$ |
| $r_{16} = -133.036$ | | |
| $d_{16} = 2.2$ | $n_{10} = 1.80518$ | $\nu_{10} = 25.43$ |
| $r_{17} = 54.696$ | | |
| $d_{17} = 28.45$ | | |
| $r_{18} = 59.917$ | | |
| $d_{18} = 6.15$ | $n_{11} = 1.60717$ | $\nu_{11} = 40.26$ |
| $r_{19} = -51.699$ | | |
| $d_{19} = 5.46$ | | |
| $r_{20} = -29.842$ | | |
| $d_{20} = 1.7$ | $n_{12} = 1.7725$ | $\nu_{12} = 49.66$ |
| $r_{21} = 1020.391$ | | |

| f | 72.36 | 118.03 | 192.74 |
|---|---|---|---|
| $D_1$ | 1.68 | 30.39 | 42.12 |

-continued

Embodiment 7
f = 72.36~192.74, F = 3.86~4.77

| | | | |
|---|---|---|---|
| D$_2$ | 26.13 | 15.79 | 2.47 |
| | $\beta_{2T}$ = −0.87, $\beta_{3T}$ = 1.696 | | |

$f_1/\sqrt{f_W \cdot f_T} = 1.106$, $|f_2|/\sqrt{f_W \cdot f_T} = 0.305$ $\overline{N}_2 = 1.763$, $f_{3a}/f_3 = 1.190$, $N_{3a} = 1.697$

Embodiment 8
f = 72.43~202.65, F 3.71~4.6

| | | | |
|---|---|---|---|
| r$_1$ = 81.035 | | | |
| d$_1$ = 2.8 | n$_1$ = 1.7495 | $\nu_1$ = 35.27 | |
| d$_2$ = 11.3 | n$_2$ = 1.603 | $\nu_2$ = 65.48 | |
| r = −325.457 | | | |
| d$_3$ = D$_1$ | | | |
| r$_4$ = −173.865 | | | |
| d$_4$ = 1.94 | n$_3$ = 1.8061 | $\nu_3$ = 40.95 | |
| r$_5$ = 90.580 | | | |
| d$_5$ = 3.42 | | | |
| r$_6$ = −70.018 | | | |
| d$_6$ = 1.69 | n$_4$ = 1.6968 | $\nu_4$ = 55.52 | |
| r$_7$ = 57.590 | | | |
| d$_7$ = 1.404 | | | |
| r$_8$ = 54.869 | | | |
| d$_8$ = 4.98 | n$_5$ = 1.80518 | $\nu_5$ = 25.43 | |
| r$_9$ = −96.741 | | | |
| d$_9$ = 1.99 | n$_6$ = 1.7725 | $\nu_6$ = 49.66 | |
| r$_{10}$ = 120.298 | | | |
| d$_{10}$ = D$_2$ | | | |
| r$_{11}$ = 137.585 | | | |
| d$_{11}$ = 3.89 | n$_7$ = 1.7200 | $\nu_7$ = 50.25 | |
| r$_{12}$ = −108.709 | | | |
| d$_{12}$ = 0.1 | | | |
| r$_{13}$ = 72.702 | | | |
| d$_{13}$ = 7.4 | n$_8$ = 1.53113 | $\nu_8$ = 62.44 | |
| r$_{14}$ = −53.859 | | | |
| d$_{14}$ = 1.85 | n$_9$ = 1.80518 | $\nu_9$ = 25.43 | |
| r$_{15}$ = 299.247 | | | |
| d$_{15}$ = 0.29 | | | |
| r$_{16}$ = 31.521 | | | |
| d$_{16}$ = 5.06 | n$_{10}$ = 1.51633 | $\nu_{10}$ = 64.15 | |
| r$_{17}$ = 88.374 | | | |
| d$_{17}$ = 28.94 | | | |
| r$_{18}$ = 63.852 | | | |
| d$_{18}$ = 6.81 | n$_{11}$ = 1.59551 | $\nu_{11}$ = 39.21 | |
| r$_{19}$ = −123.290 | | | |
| d$_{19}$ = 4.913 | | | |
| r$_{20}$ = −24.866 | | | |
| d$_{20}$ = 1.65 | n$_{12}$ = 1.7725 | $\nu_{12}$ = 49.66 | |
| r$_{21}$ = −85.786 | | | |
| f | 72.43 | 121.24 | 202.65 |
| D$_1$ | 1.88 | 31.65 | 45.29 |
| D$_2$ | 27.07 | 16.13 | 1.73 |
| | $\beta_{2T}$ = −0.93, $\beta_{3T}$ = −1.27 | | |

$f_1/\sqrt{f_W \cdot f_T} = 1.075$, $|f_2|/\sqrt{f_W \cdot f_T} = 0.296$ $\overline{N}_2 = 1.758$, $f_{3a}/f_3 = 1.464$, $N_{3a} = 1.720$

Embodiment 9
f = 72.45~192.0, F 3.76~4.77

| | | | |
|---|---|---|---|
| r$_1$ = 90.573 | | | |
| d$_1$ = 2.8 | n$_1$ = 1.76182 | $\nu_1$ = 26.55 | |
| d$_2$ = 11.5 | n$_2$ = 1.62012 | $\nu_2$ = 49.66 | |
| r$_3$ = −264.521 | | | |
| d$_3$ = D$_1$ | | | |
| r$_4$ = −180.985 | | | |
| d$_4$ = 1.95 | n$_3$ = 1.80400 | $\nu_3$ = 46.57 | |
| r$_5$ = 98.545 | | | |
| d$_5$ = 3.44 | | | |
| r$_6$ = −57.704 | | | |

-continued

Embodiment 9
f = 72.45~192.0, F 3.76~4.77

| | | | |
|---|---|---|---|
| d$_6$ = 1.70 | n$_4$ = 1.713 | $\nu_4$ = 53.84 | |
| r$_7$ = 52.984 | | | |
| d$_7$ = 1.443 | | | |
| r$_8$ = 51.427 | | | |
| d$_8$ = 5.00 | n$_5$ = 1.80518 | $\nu_5$ = 25.43 | |
| r$_9$ = −92.833 | | | |
| d$_9$ = 1.35 | | | |
| r$_{10}$ = −74.014 | | | |
| d$_{10}$ = 2.00 | n$_6$ = 1.77250 | $\nu_6$ = 49.66 | |
| r$_{11}$ = 141.342 | | | |
| d$_{11}$ = D$_2$ | | | |
| r$_{12}$ = 167.159 | | | |
| d$_{12}$ = 4.00 | n$_7$ = 1.72916 | $\nu_7$ = 54.68 | |
| r$_{13}$ = −77.137 | | | |
| d$_{13}$ = 0.1 | | | |
| r$_{14}$ = 50.945 | | | |
| d$_{14}$ = 7.6 | n$_8$ = 1.52542 | $\nu_8$ = 64.55 | |
| r$_{15}$ = −55.047 | | | |
| d$_{15}$ = 1.9 | n$_9$ = 1.78470 | $\nu_9$ = 26.22 | |
| r$_{16}$ = 144.787 | | | |
| d$_{16}$ = 0.3 | | | |
| r$_{17}$ = 38.188 | | | |
| d$_{17}$ = 5.2 | n$_{10}$ = 1.51821 | $\nu_{10}$ = 65.04 | |
| r$_{18}$ = 196.731 | | | |
| d$_{18}$ = 29.41 | | | |
| r$_{19}$ = 73.671 | | | |
| d$_{19}$ = 7.00 | n$_{11}$ = 1.59270 | $\nu_{11}$ = 35.29 | |
| r$_{20}$ = −134.754 | | | |
| d$_{20}$ = 5.09 | | | |
| r$_{21}$ = −25.945 | | | |
| d$_{21}$ = 1.70 | n$_{12}$ = 1.77250 | $\nu_{12}$ = 49.66 | |
| r$_{22}$ = −78.115 | | | |
| f | 72.45 | 118.25 | 192.0 |
| D$_1$ | 1.86 | 25.26 | 37.66 |
| D$_2$ | 18.52 | 10.42 | 1.93 |
| | $\beta_{2T}$ = −0.62, $\beta_{3T}$ = −1.50 | | |

$f_1/\sqrt{f_W \cdot f_T} = 1.115$, $|f_2|/\sqrt{f_W \cdot f_T} = 0.270$ $\overline{N}_2 = 1.763$, $f_{3a}/f_3 = 1.15$, $N_{3a} = 1.729$ In respective embodiments shown in the above, reference symbol f represents the focal length of the lens system as a whole, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $\nu_1$, $\nu_2$, ... respectively represent Abbe's numbers of respective lenses.

Figure 13A:
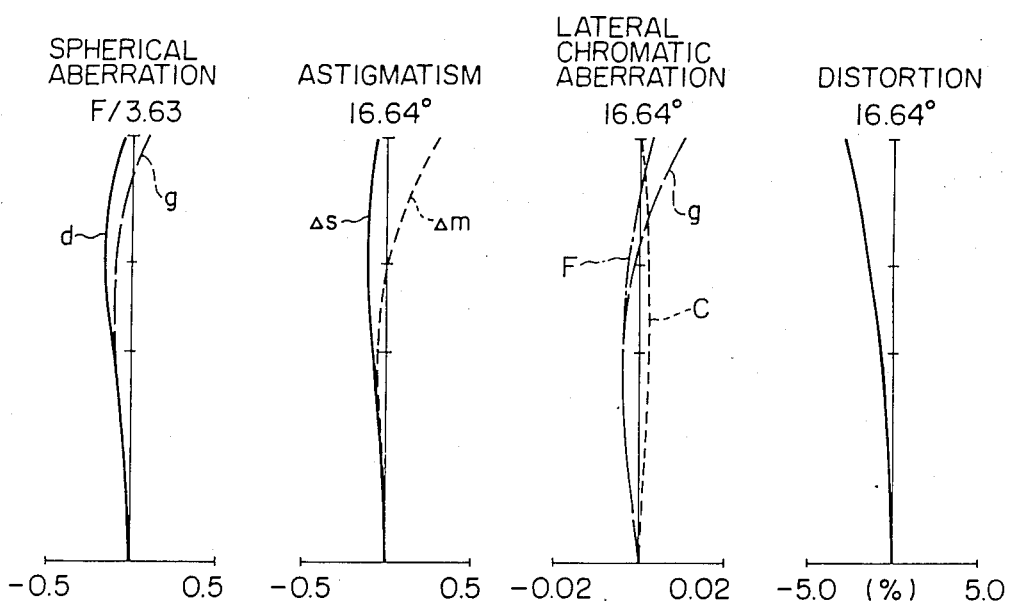
FIGS. 13A, 13B and 13C respectively show graphs illustrating aberration curves of Embodiment 1.
Figure 13B:
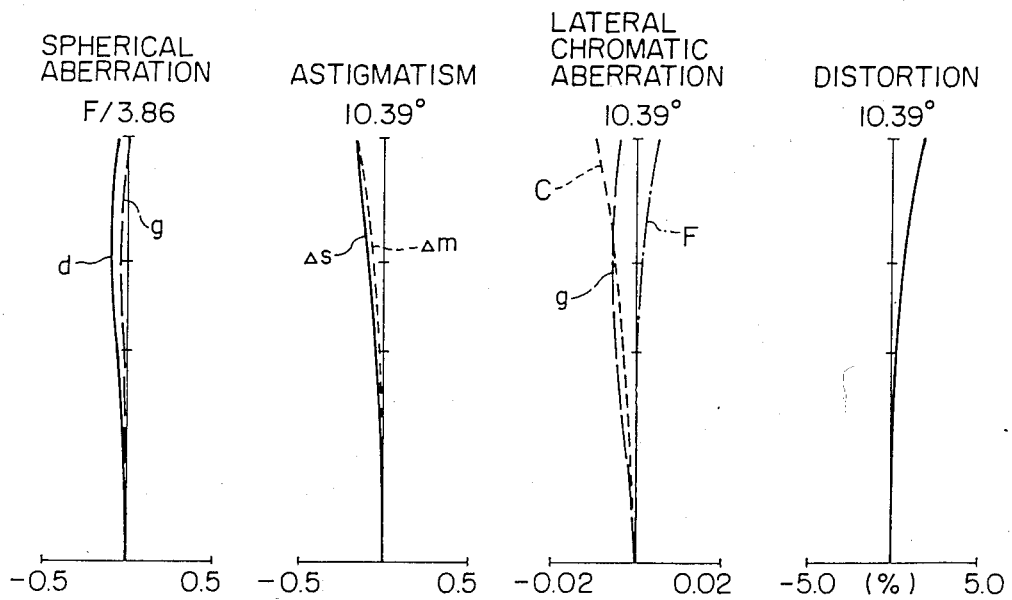
Figure 13C:
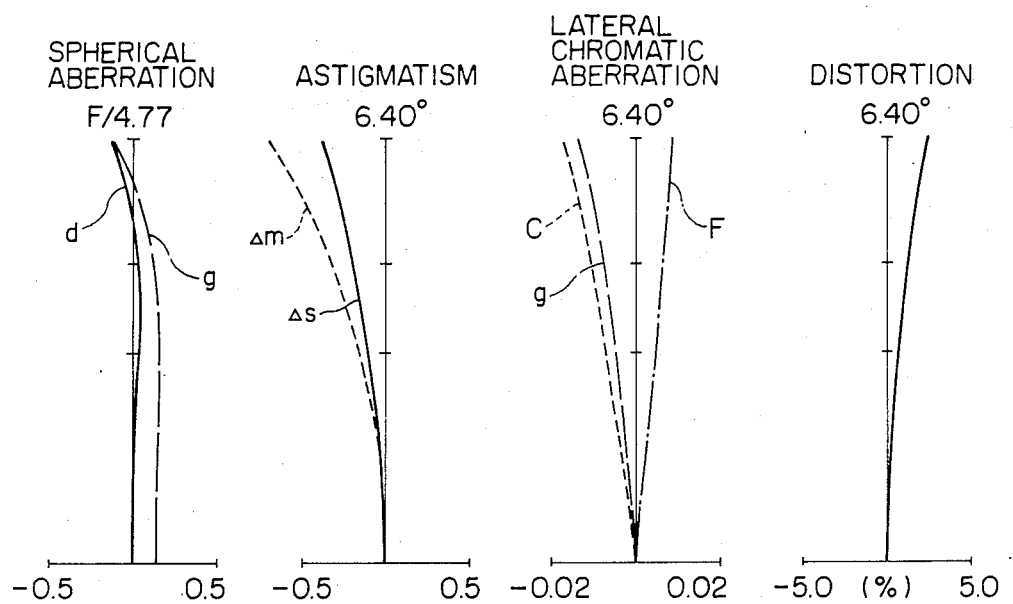

Out of respective embodiments shown in the above, Embodiment 1 has the lens configuration shown in FIG. 4. In said Embodiment 1, the first lens group I comprises a cemented doublet consisting of a negative lens and a positive lens, the second lens group II comprises a negative lens L$_1$, a negative lens L$_2$, and a cemented doublet consisting of a positive lens L$_3$ and a negative lens L$_4$, and the third lens group III comprises a front subgroup IIIa and a rear subgroup IIIb wherein said front subgroup IIIa comprises a positive lens, a cemented doublet consisting of a positive lens and a negative lens, and a positive lens, and said rear subgroup IIIb comprises a positive lens, and a negative lens. Besides, Embodiment 1 is arranged to be zoomed from the wide position (W) to the teleposition (T) by moving respective lens groups as shown in FIGS. 1 and 2. Graphs of aberration curves of Embodiment 1 in respective positions (wide position, position of intermediate focal length and teleposition) are as shown in FIGS. 13A, 13B and 13C respectively.

Figure 5:
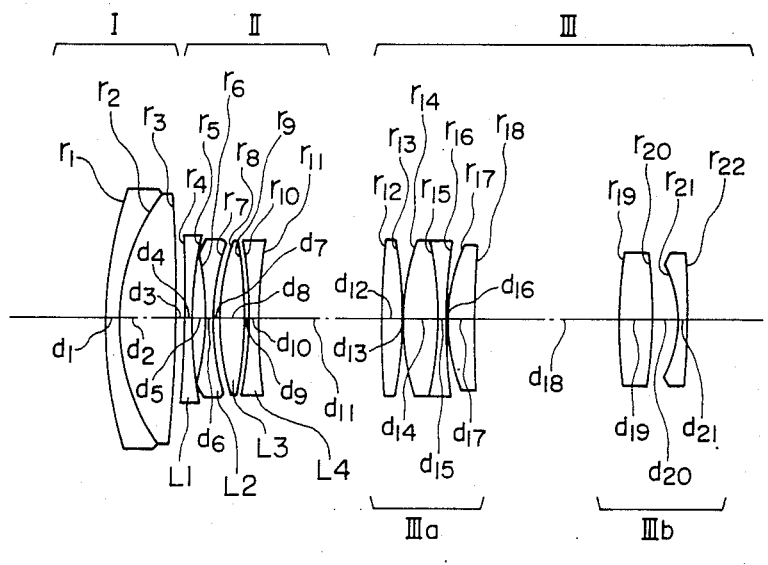
FIGS. 5 through 12 respectively show sectional views of Embodiments 2 through 9 of the telephoto zoom lens system according to the present invention.
Figure 14A:
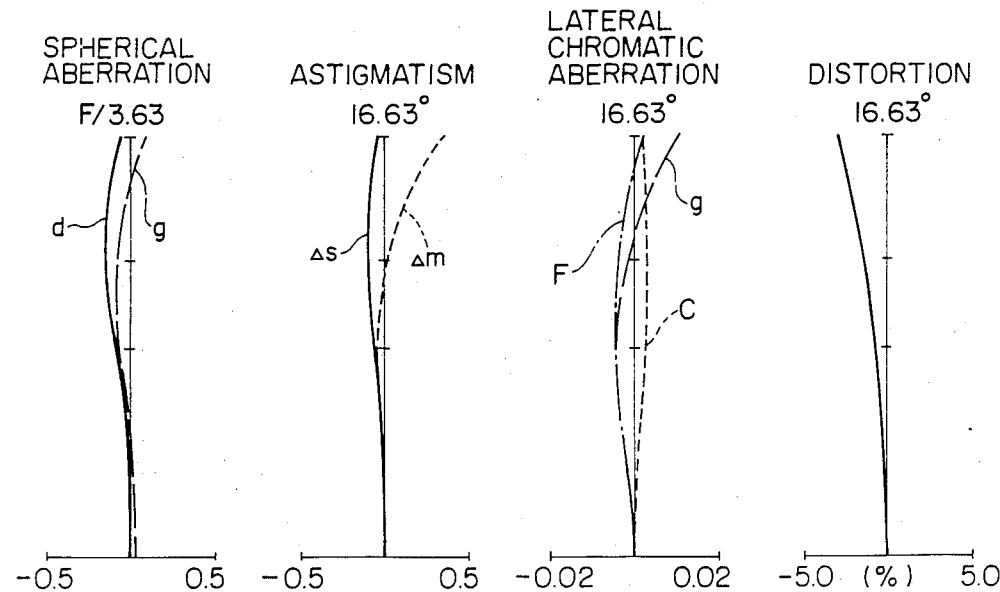
FIGS. 14A, 14B and 14C respectively show graphs illustrating aberration curves of Embodiment 2.
Figure 14B:
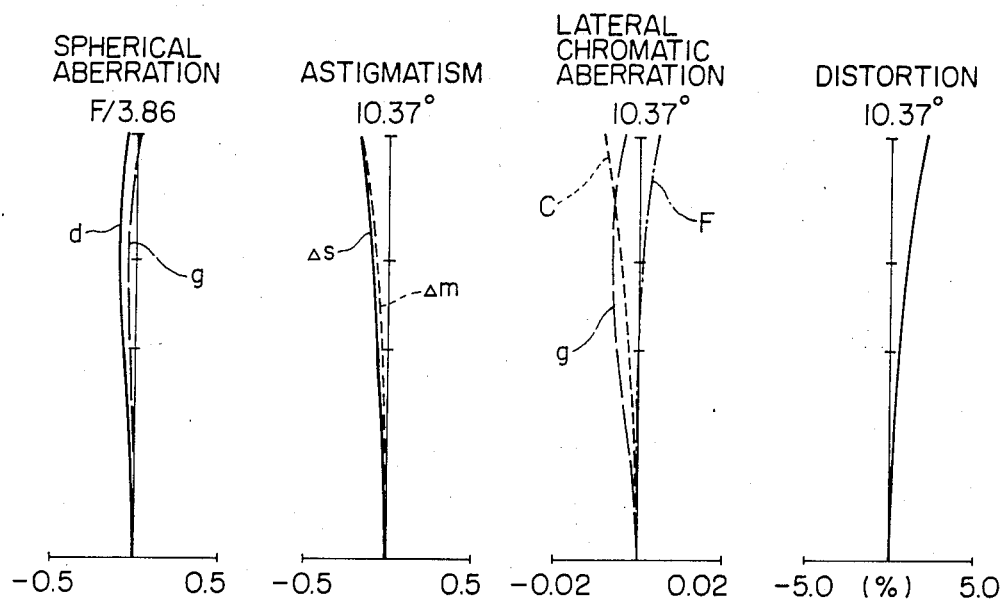
Figure 14C:
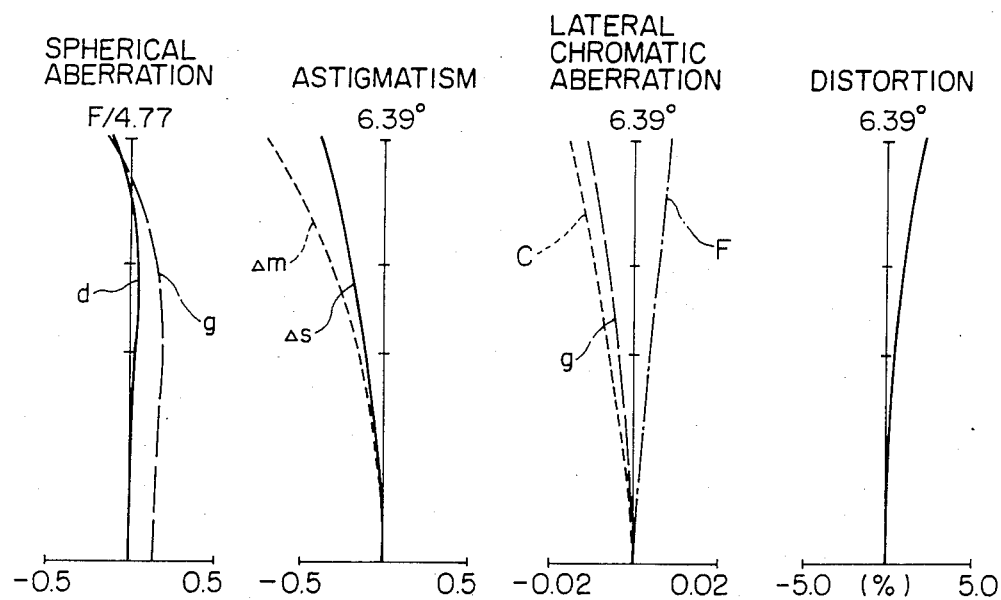

Embodiment 2 has the lens configuration shown in FIG. 5 and is arranged that the second lens group II comprises a negative lens $L_1$, a negative lens $L_2$, a positive lens $L_3$, and a negative lens $L_4$ which are respectively arranged as single lenses spaced from each other. The first lens group I and the third lens group III respectively have lens configurations that resemble those of Embodiment 1. Graphs of aberration curves of Embodiment 2 in respective positions are as shown in FIGS. 14A, 14B and 14C respectively.

Figure 6:
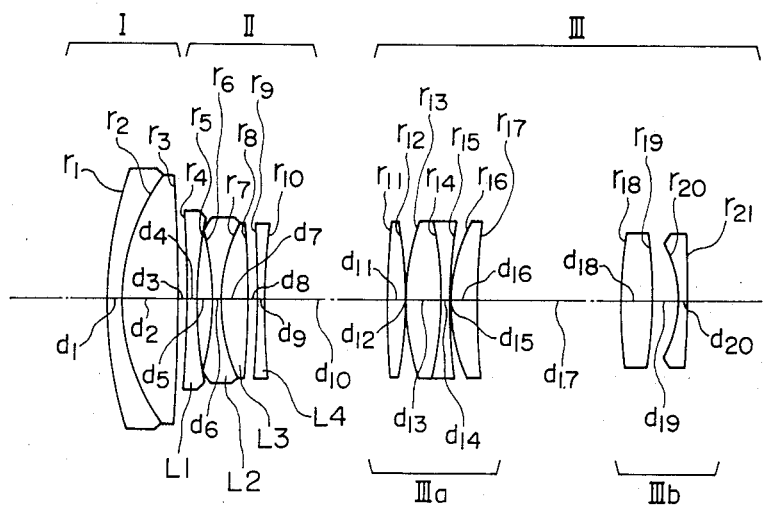
Figure 15A:
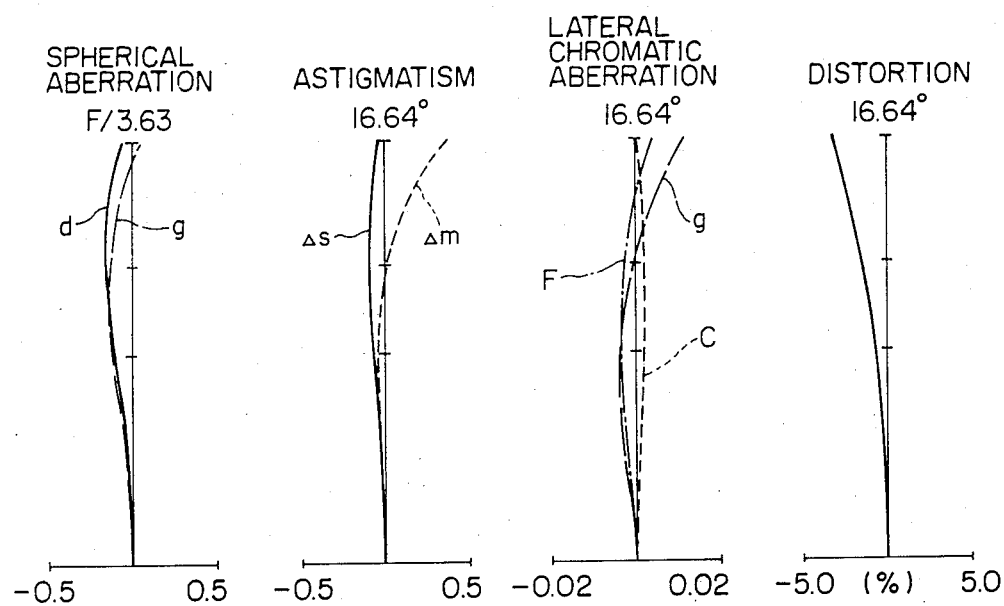
FIGS. 15A, 15B and 15C respectively show graphs illustrating aberration curves of Embodiment 3.
Figure 15B:
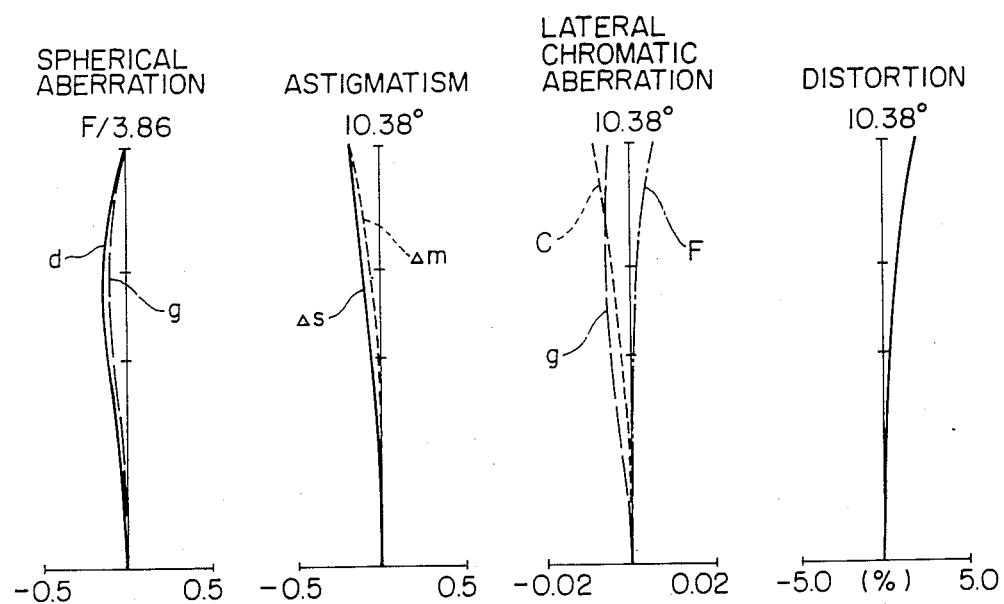
Figure 15C:
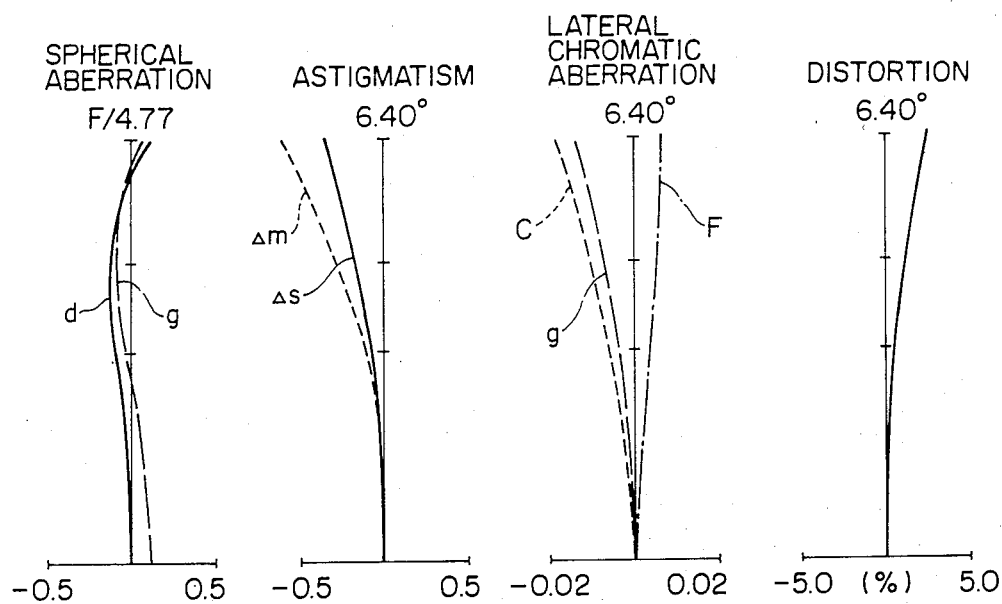

Embodiment 3 has the lens configuration shown in FIG. 6 and is arranged that the second lens group II comprises a negative lens $L_1$, a cemented doublet consisting of a negative lens $L_2$ and a positive lens $L_3$, and a negative lens $L_4$. The first lens group I and the third lens group III respectively have lens configurations that resemble those of Embodiments 1 and 2. Graphs illustrating aberration curves of Embodiment 3 in respective positions are as shown in FIGS. 15A, 15B and 15C respectively.

Figure 7:
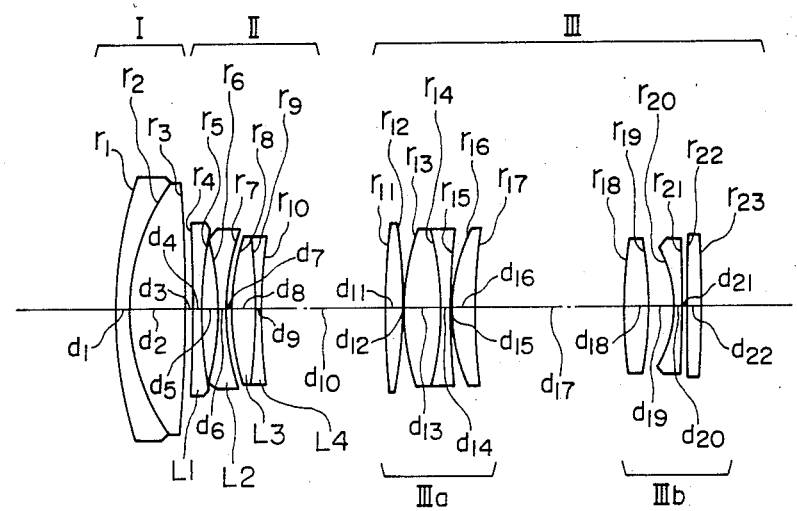
Figure 16A:
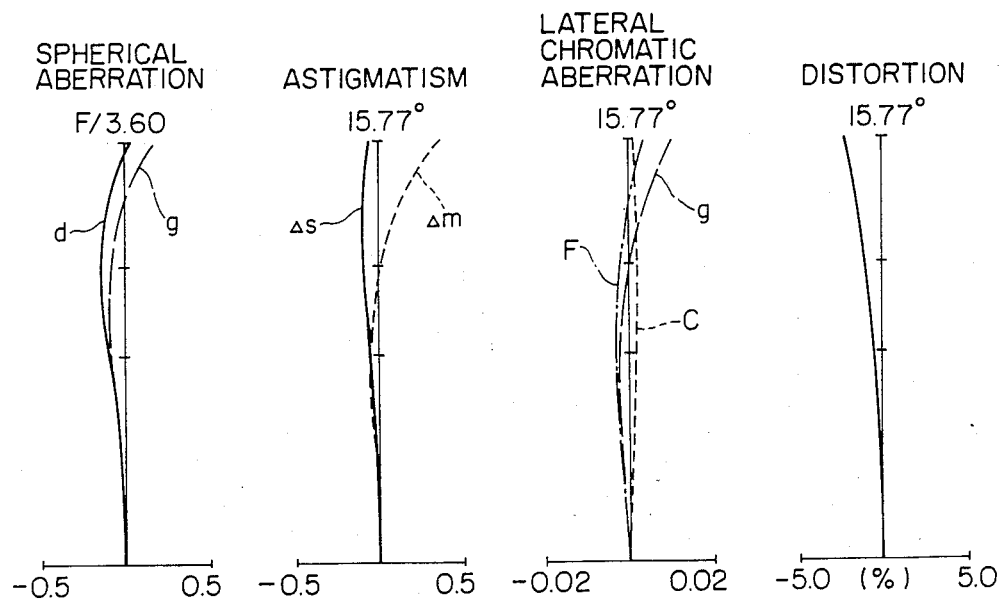
FIGS. 16A, 16B and 16C respectively show graphs illustrating aberration curves of Embodiment 4.
Figure 16B:
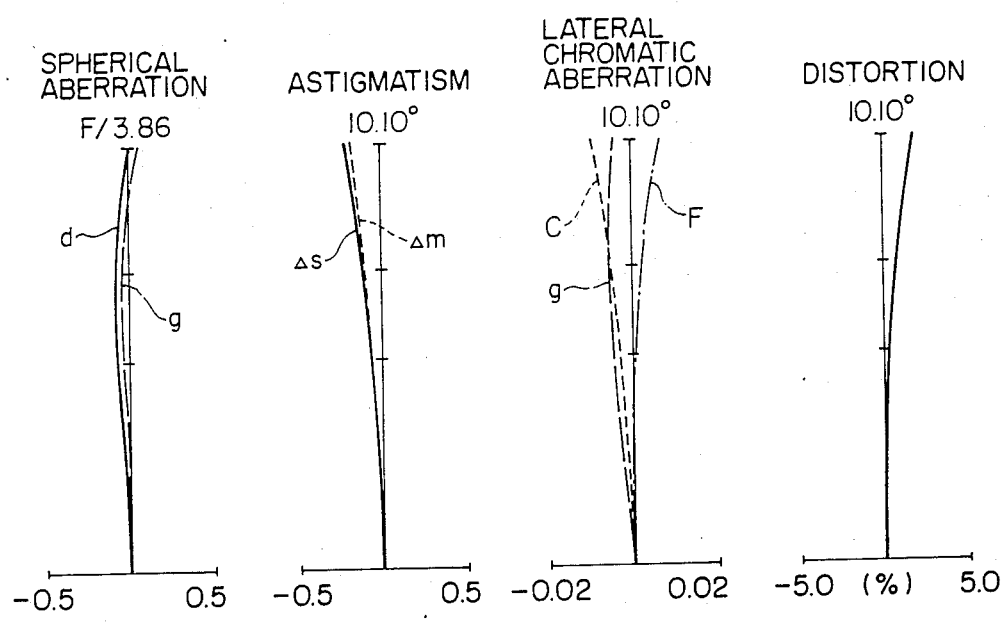
Figure 16C:
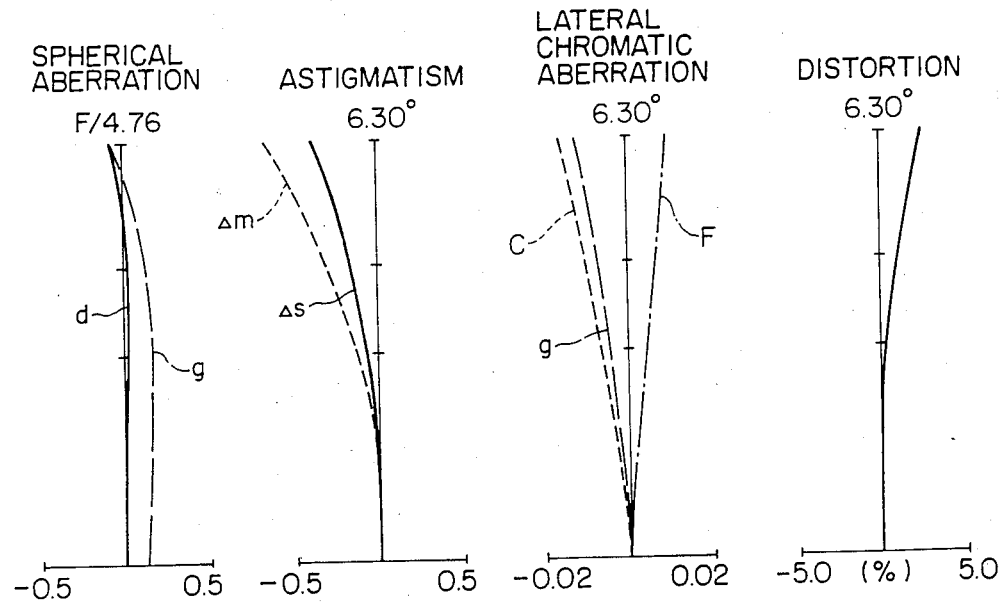

Embodiment 4 has the lens configuration shown in FIG. 7. In Embodiment 4, the third lens group III is arranged that the front subgroup IIIa has a lens configuration that resembles those of Embodiments 1, 2 and 3 but the rear subgroup IIIb comprises a positive lens, a negative lens, and a positive lens. The first lens group I has a lens configuration that resembles those of Embodiment 1, 2 and 3, and the second lens group II has a lens configuration that resembles that of Embodiment 1. Graphs illustrating aberration curves of said Embodiment 4 in respective positions are as shown in FIGS. 16A, 16B and 16C respectively.

Figure 8:
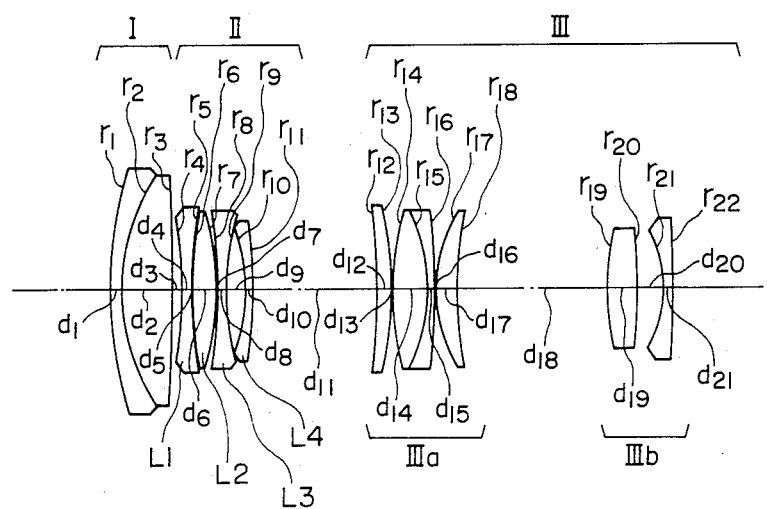
Figure 17A:
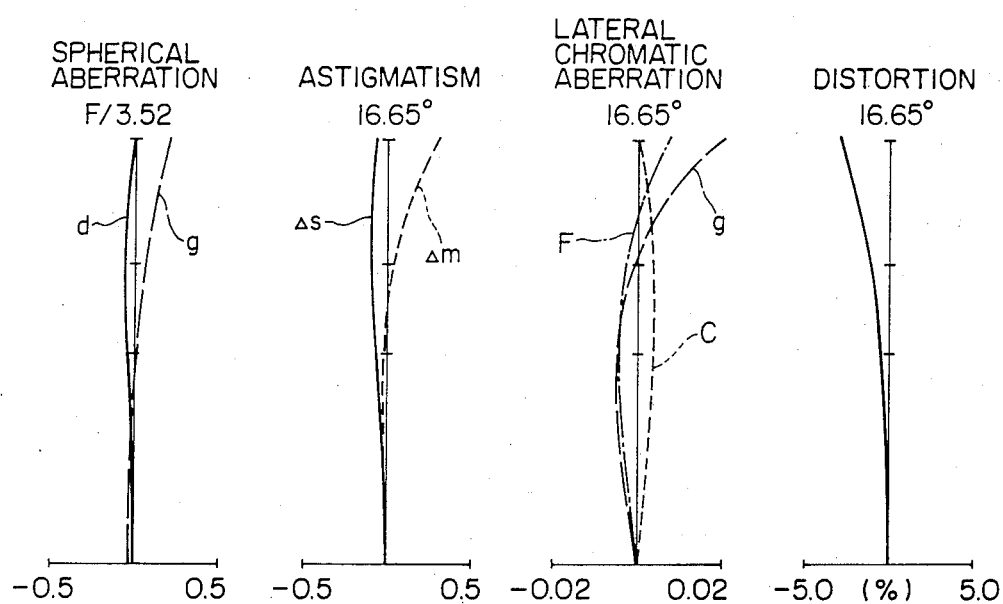
FIGS. 17A, 17B and 17C respectively show graphs illustrating aberration curves of Embodiment 5.
Figure 17B:
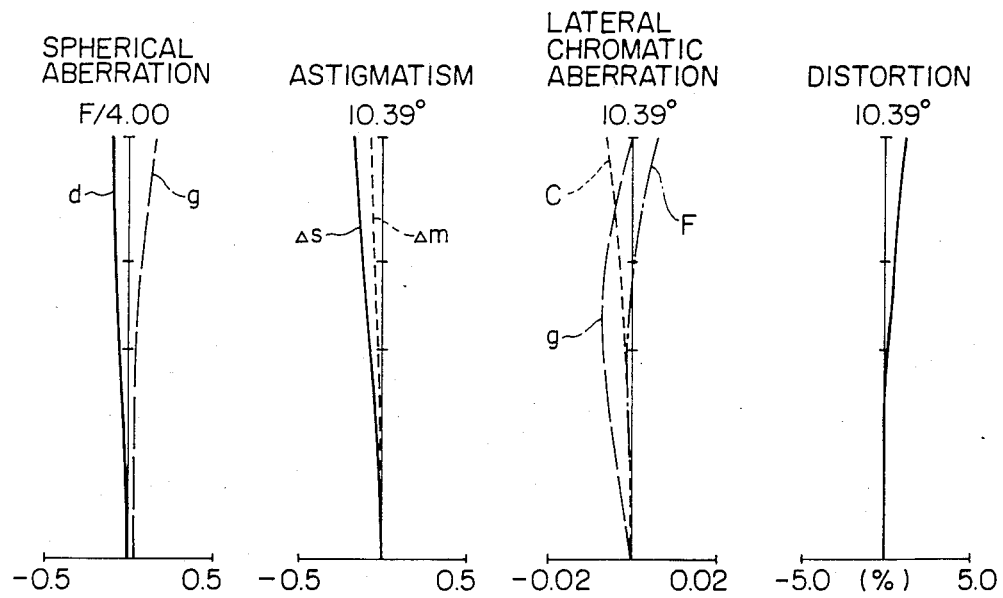
Figure 17C:
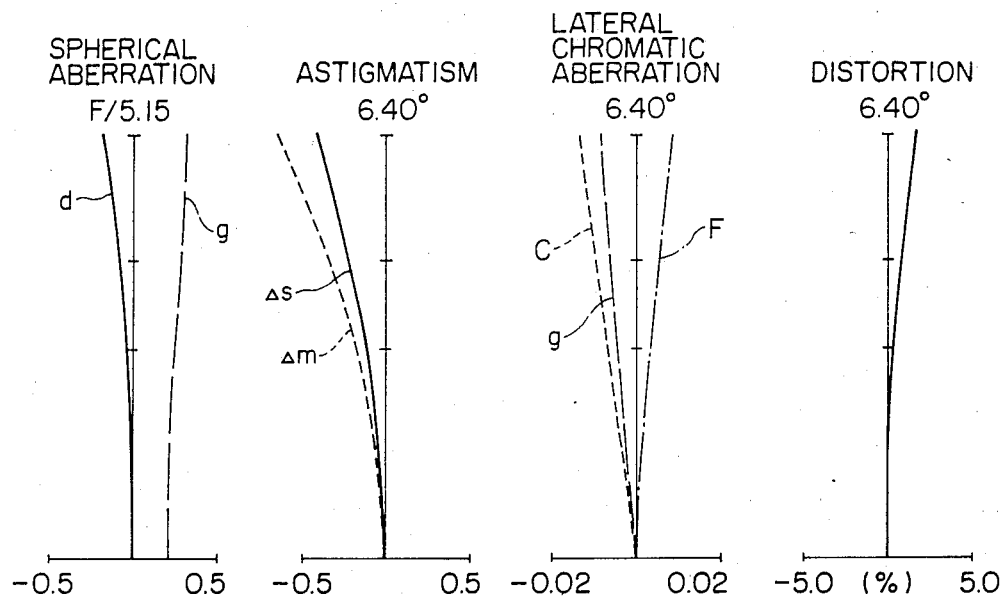

Embodiment 5 has the lens configuration shown in FIG. 8 and is arranged that the second lens group II comprises a negative lens $L_1$, a positive lens $L_2$, a negative lens $L_3$, and a negative lens $L_4$. In other words, the positive lens $L_2$ is located on the object side of the negative lens $L_3$. The first lens group I has a lens configuration that resembles those of Embodiments 1 through 4, and the third lens group III has a lens configuration that resembles those of Embodiments 1 through 3. Graphs illustrating aberration curves of said Embodiment 5 in respective positions are as shown in FIGS. 17A, 17B and 17C respectively.

Figure 9:
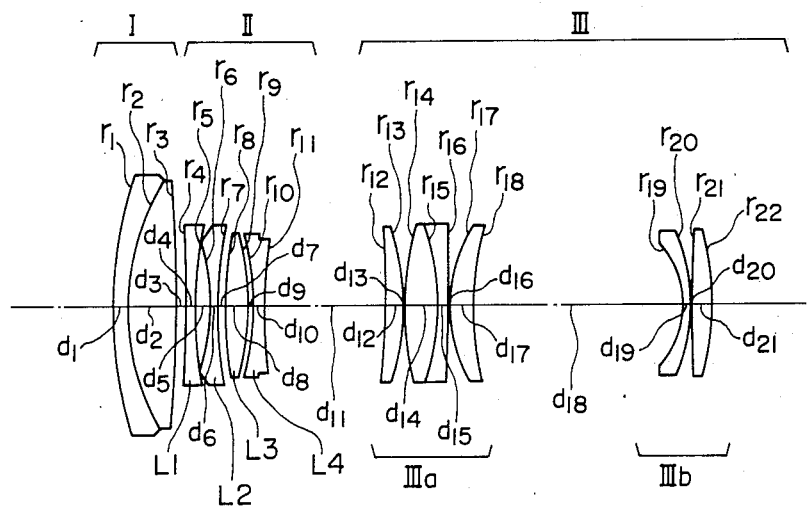
Figure 18A:
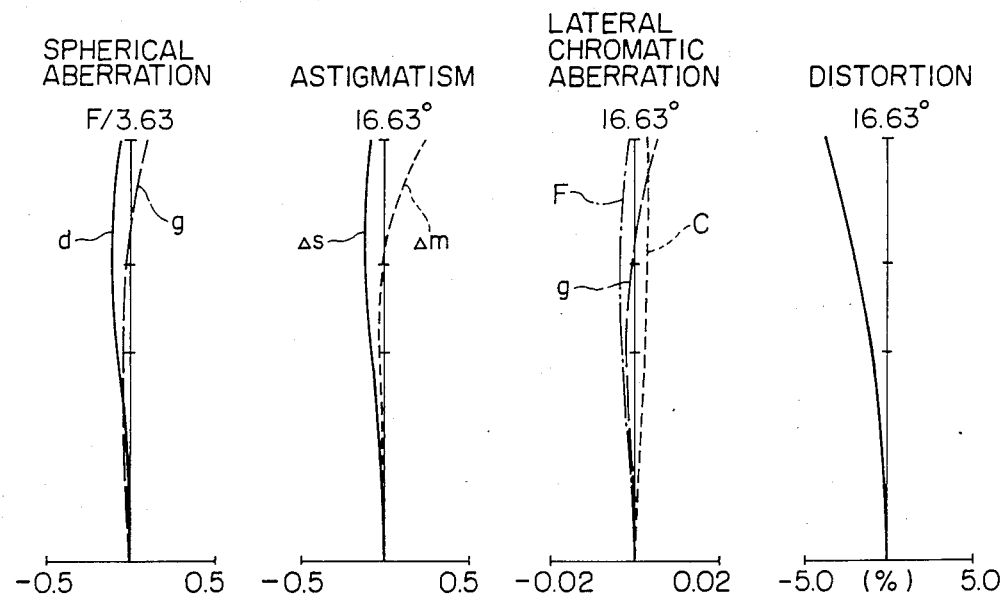
FIGS. 18A, 18B and 18C respectively show graphs illustrating aberration curves of Embodiment 6.
Figure 18B:
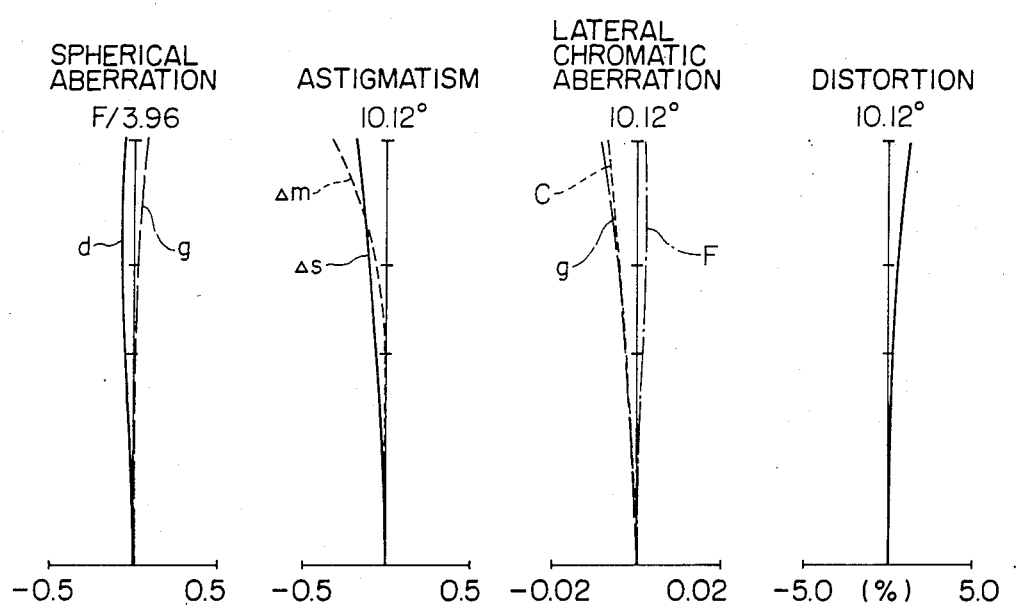
Figure 18C:
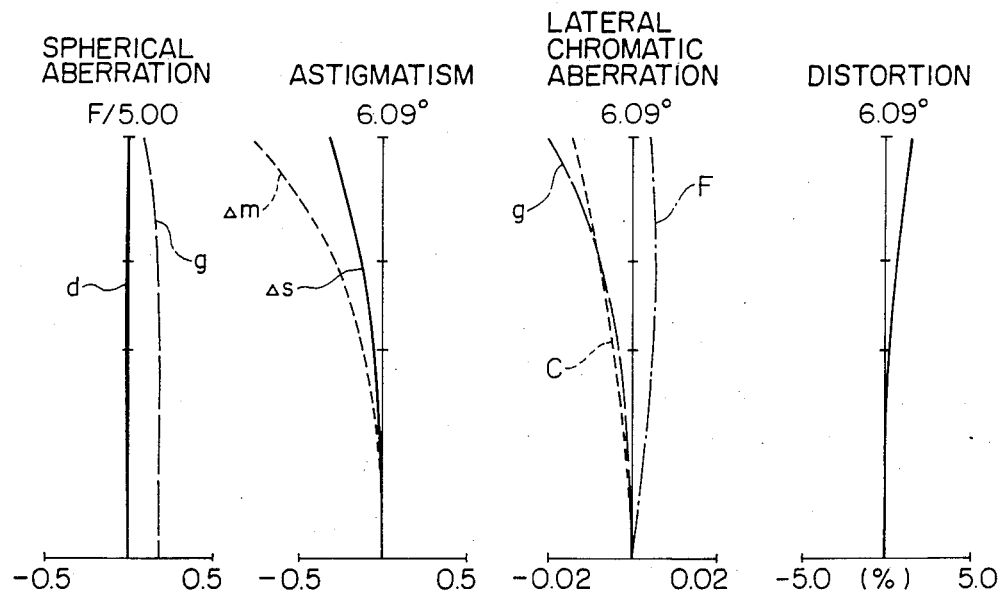

Embodiment 6 has the lens configuration shown in FIG. 9 and is arranged that the rear subgroup IIIb of the third lens group III comprises a negative lens, and a positive lens. The first lens group I has a lens configuration that resembles those of Embodiments 1 through 5 and the second lens group has a lens configuration that resembles that of Embodiment 2. In case of said Embodiment 6, the focal length in the teleposition exceeds 200, i.e., the zoom ratio is large. Graphs illustrating aberration curves of said Embodiment 6 in respective positions are as shown in FIGS. 18A, 18B and 18C respectively.

Figure 10:
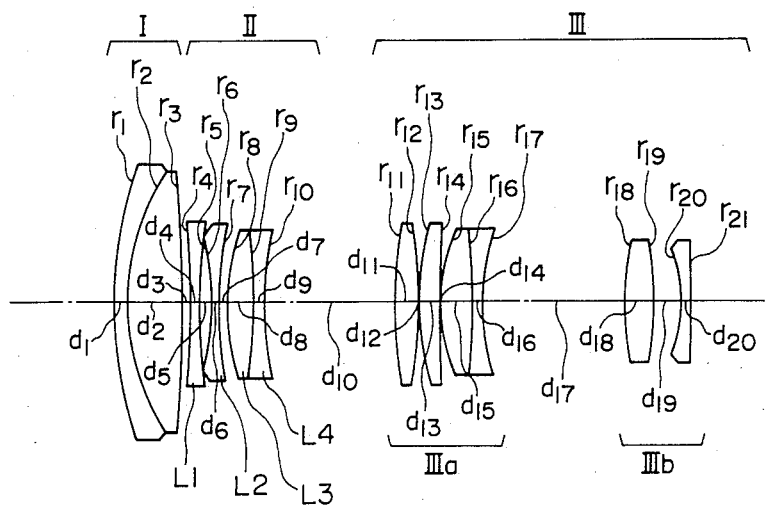
Figure 19A:
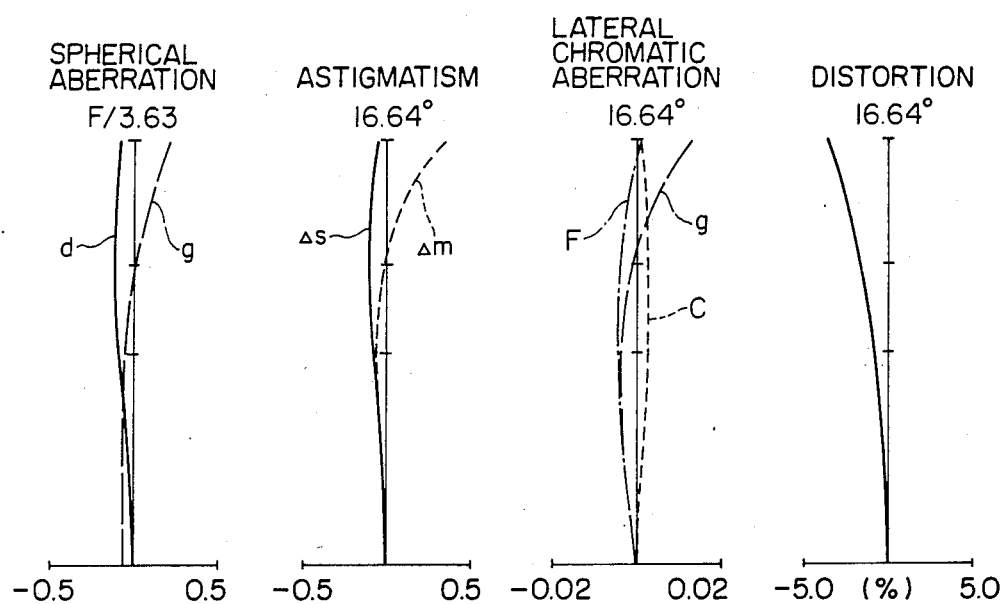
FIGS. 19A, 19B and 19C respectively show graphs illustrating aberration curves of Embodiment 7.
Figure 19B:
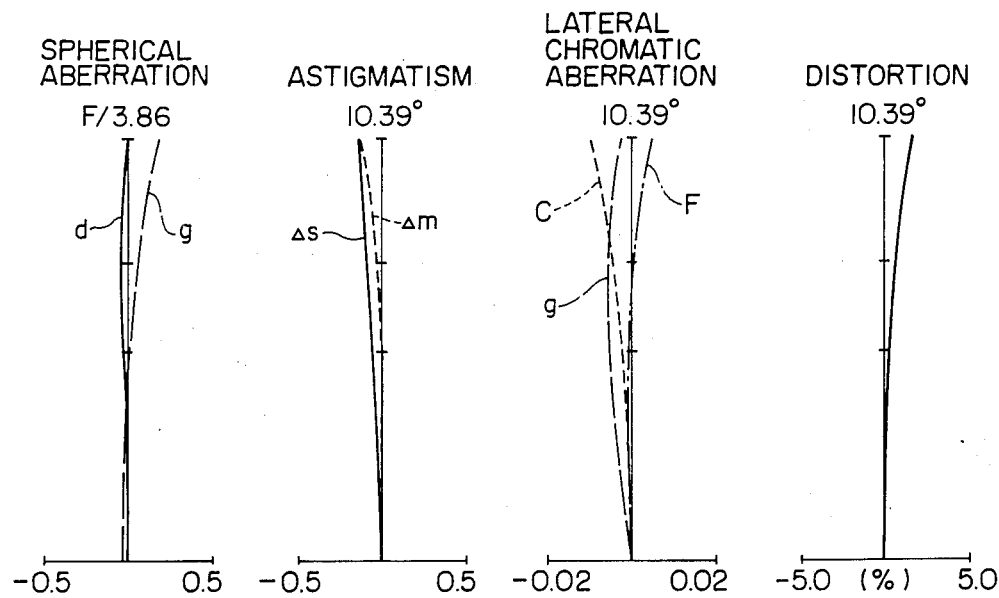
Figure 19C:
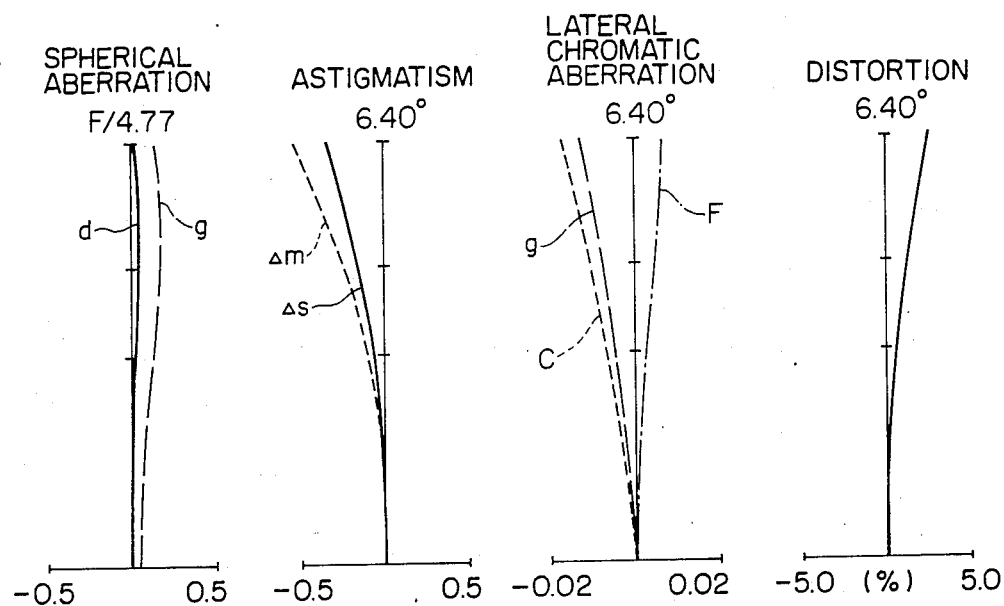

Embodiment 7 has the lens configuration shown in FIG. 10 and is arranged that the front subgroup IIIa of the third lens group III comprises a positive lens, a positive lens, and a cemented doublet consisting of a positive lens and a negative lens. The first lens group I has a lens configuration that resembles those of Embodiments 1 through 6, and the second lens group II has a lens configuration that resembles those of Embodiments 1 and 4. Graphs illustrating aberration curves of said Embodiment 7 in respective positions are as shown in FIGS. 19A, 19B and 19C respectively.

Figure 11:
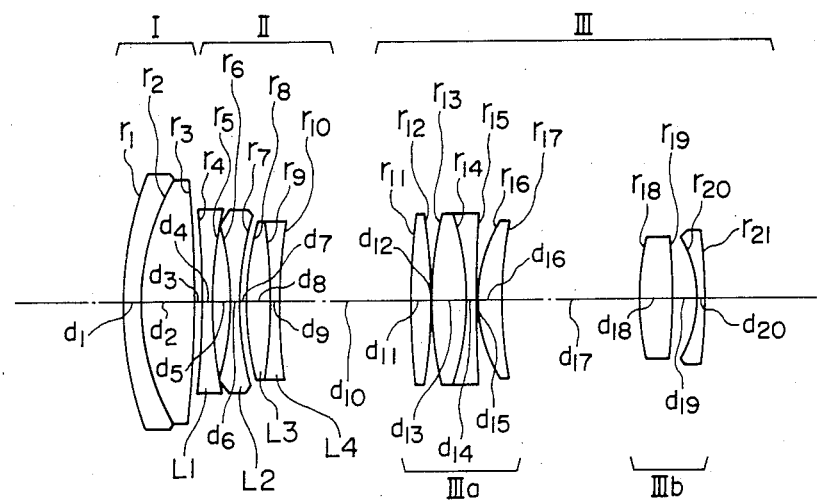
Figure 20A:
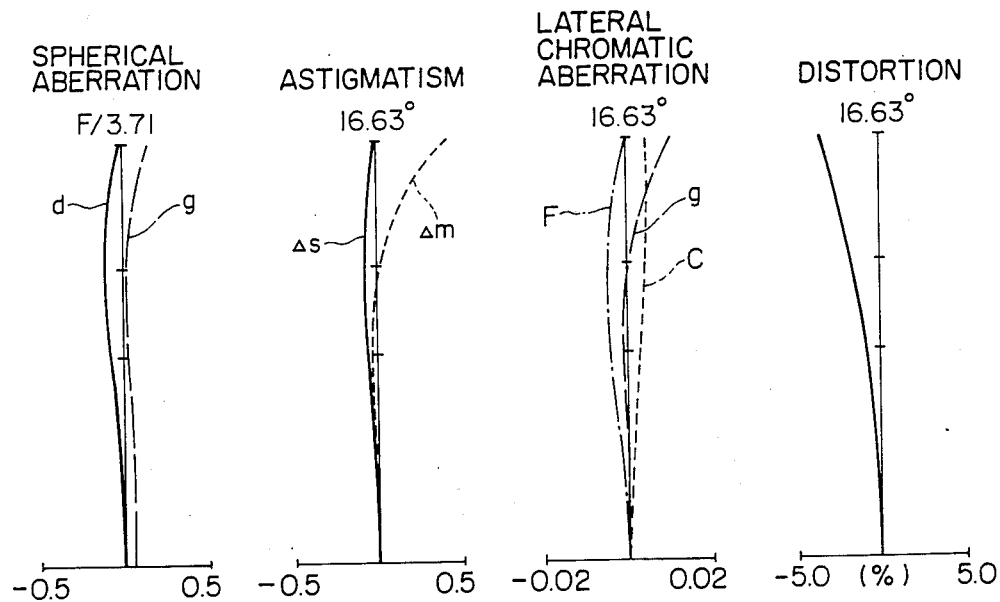
FIGS. 20A, 20B and 20C respectively show graphs illustrating aberration curves of Embodiment 8.
Figure 20B:
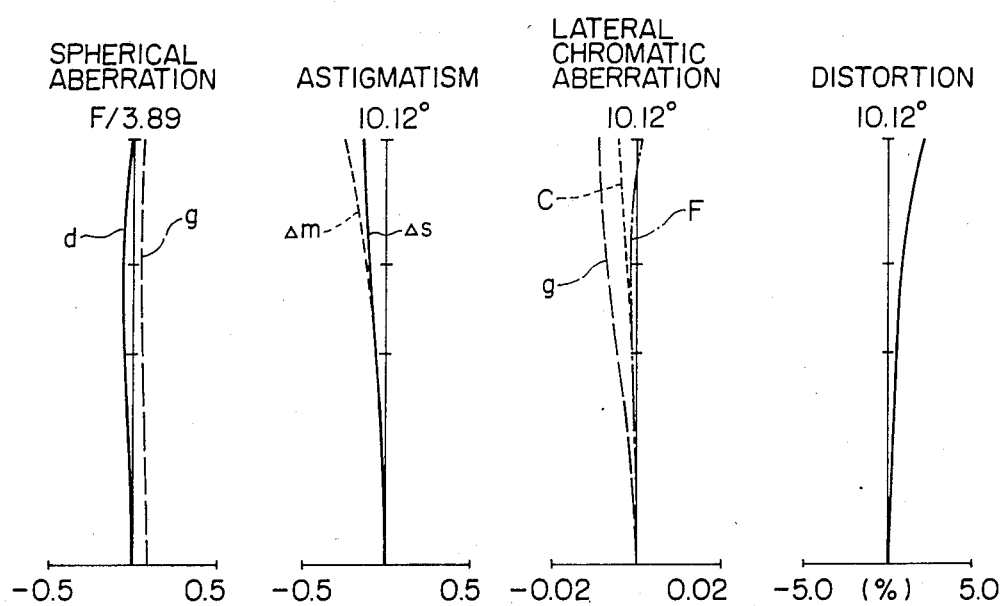
Figure 20C:
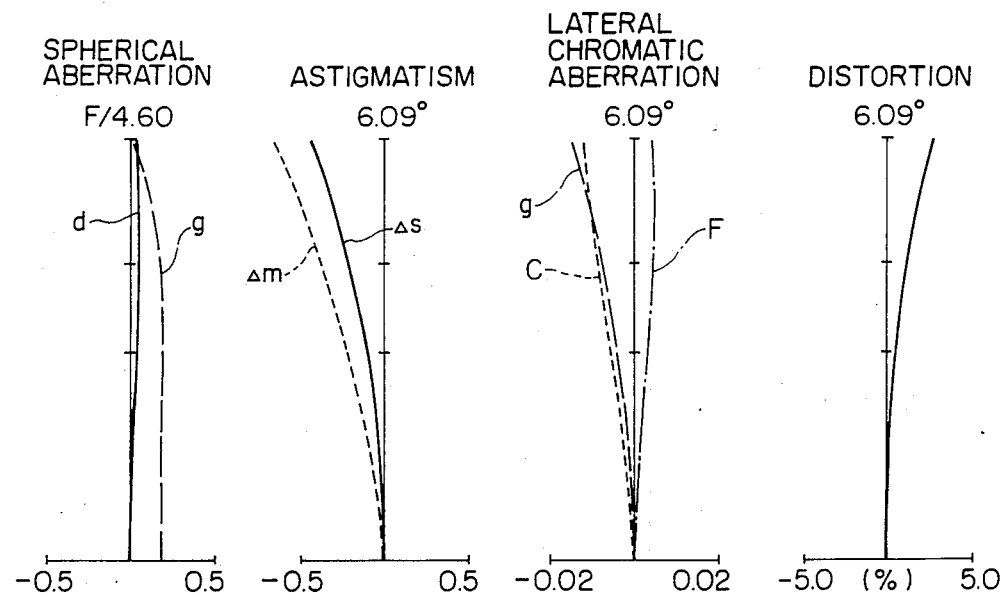

Embodiment 8 has the lens configuration shown in FIG. 11. In said Embodiment 8, the first lens group I has a lens configuration that resembles those of Embodiments 1 through 7, the second lens group II has a lens configuration that resembles those of Embodiments 1, 4 and 7, and the third lens group has a lens configuration that resembles those of Embodiments 2, 3 and 4. Graphs illustrating aberration curves of said Embodiment 8 in respective positions are as shown in FIGS. 20A, 20B and 20C respectively.

Figure 12:
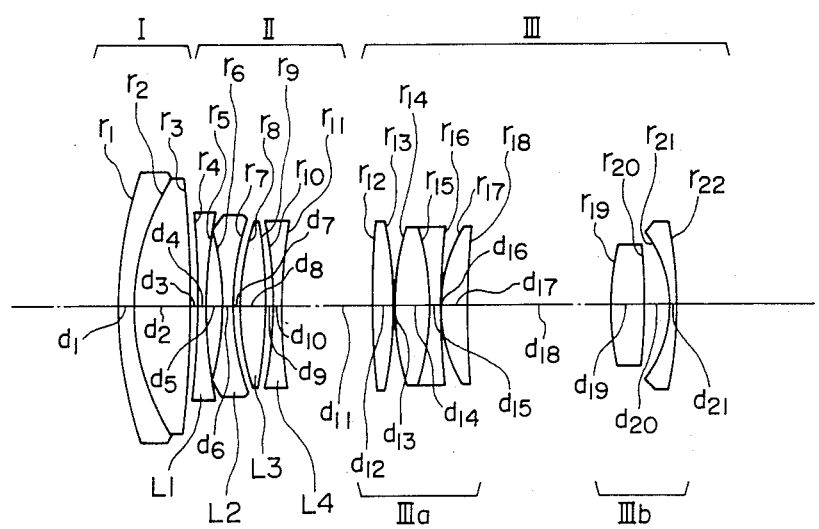
Figure 21A:
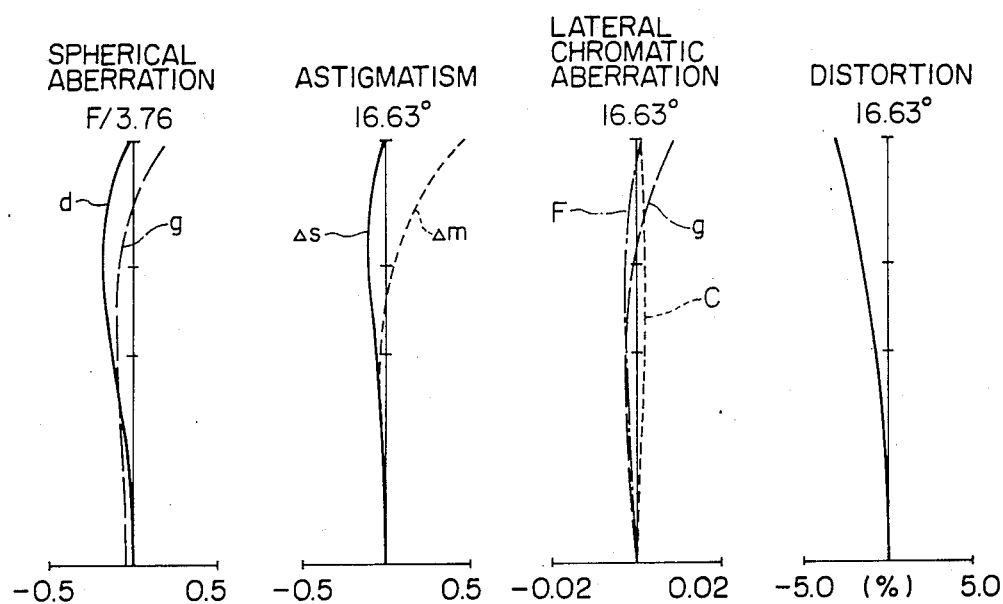
Figure 21B:
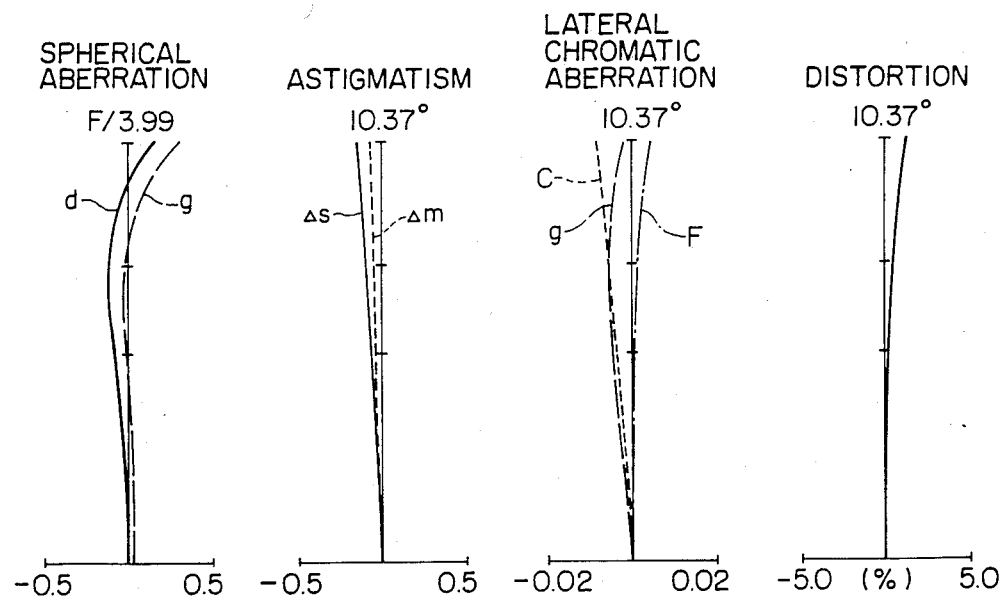

Embodiment 9 has the lens configuration shown in FIG. 12. In said Embodiment 9, the first lens group I has a lens configuration that resembles those of Embodiments 1 through 7, the second lens group II has a lens configuration that resembles those of Embodiments 1, 4 and 7, and the third lens group III has a lens configuration that resembles those of Embodiments 1, 2, 3 and 4. Graphs illustrating aberration curves of said Embodiment 9 in respective positions are as shown in FIGS. 21A, 21B and 21C respectively.

Aberration coefficients of the third order of Embodiment 1 in respective positions are as given in Tables A, B and C shown below.

TABLE A

| K | SA3 | CMA3 | AST3 | DIS3 | PTZ3 | SAC | SLC |
|---|---|---|---|---|---|---|---|
| 1 | −0.00412 | −0.01373 | −0.00509 | −0.05651 | −0.04573 | −0.01347 | −0.01498 |
| 2 | 0.00581 | −0.00566 | 0.00061 | −0.00352 | 0.01020 | 0.01784 | −0.00480 |
| 3 | −0.00565 | 0.06995 | −0.09617 | 0.43967 | −0.01043 | −0.00518 | 0.02136 |
| 4 | 0.00822 | −0.09315 | 0.11734 | −0.51062 | 0.01779 | 0.00812 | −0.03069 |
| 5 | 0.00537 | 0.02734 | 0.01546 | 0.09071 | 0.03802 | 0.00805 | 0.01365 |
| 6 | 0.00214 | −0.02332 | 0.02821 | −0.31153 | 0.05763 | 0.00591 | −0.02145 |
| 7 | 0.38428 | −0.18632 | 0.01004 | −0.01275 | 0.06882 | 0.02224 | −0.00359 |
| 8 | −0.45301 | 0.22482 | −0.01240 | 0.01476 | −0.07682 | −0.05551 | 0.00918 |
| 9 | 0.00001 | −0.00015 | 0.00031 | 0.00290 | −0.00079 | −0.00355 | 0.02168 |
| 10 | 0.10319 | 0.11242 | 0.01361 | 0.01771 | 0.03514 | 0.01676 | 0.00609 |
| 11 | −0.12455 | −0.21643 | −0.04179 | −0.03581 | −0.02003 | −0.01983 | −0.01149 |
| 12 | −0.01165 | 0.05326 | −0.02707 | 0.10064 | −0.03895 | −0.01207 | 0.01841 |
| 13 | −0.09432 | −0.13264 | −0.02073 | −0.03796 | −0.06025 | −0.01647 | −0.00772 |
| 14 | 0.12082 | −0.02339 | 0.03804 | −0.02911 | 0.01383 | 0.05658 | −0.03175 |
| 15 | 0.00164 | 0.01165 | 0.00922 | 0.08594 | 0.02699 | 0.01434 | 0.03403 |
| 16 | −0.14224 | −0.20544 | −0.03297 | −0.05461 | −0.08046 | −0.01866 | −0.00898 |
| 17 | −0.00396 | 0.04086 | −0.04687 | 0.09000 | 0.02072 | −0.00323 | 0.01110 |
| 18 | 0.00070 | −0.01936 | 0.05943 | −0.11169 | −0.04730 | 0.00199 | −0.01830 |
| 19 | −0.21244 | 0.08482 | −0.00376 | 0.00567 | −0.03888 | −0.01908 | 0.00254 |
| 20 | 0.42108 | 0.36958 | 0.03611 | 0.05268 | 0.14378 | 0.01977 | 0.00579 |
| 21 | −0.02013 | 0.08704 | −0.04183 | 0.09665 | −0.02521 | −0.00668 | 0.00963 |
| Σ | −0.01881 | −0.01750 | −0.00028 | −0.16675 | −0.01193 | −0.00213 | −0.00129 |

TABLE B

| K | SA3 | CMA3 | AST3 | DIS3 | PTZ3 | SAC | SLC |
|---|---|---|---|---|---|---|---|
| 1 | −0.02295 | 0.02090 | −0.00211 | 0.01295 | −0.04053 | −0.03181 | 0.00966 |
| 2 | 0.03237 | −0.08511 | 0.02487 | −0.02972 | 0.00904 | 0.04213 | −0.03693 |
| 3 | −0.03151 | 0.22606 | −0.18021 | 0.45310 | −0.00825 | −0.01222 | 0.02923 |
| 4 | 0.02893 | −0.19112 | 0.14030 | −0.34368 | 0.01576 | 0.01367 | −0.03010 |
| 5 | 0.00442 | 0.02105 | 0.01114 | 0.07114 | 0.03369 | 0.00920 | 0.01459 |
| 6 | 0.01099 | −0.07029 | 0.04993 | −0.21524 | 0.05108 | 0.00975 | −0.02078 |
| 7 | 0.61499 | −0.07876 | 0.00112 | −0.00265 | 0.06100 | 0.02914 | −0.00124 |
| 8 | −0.72302 | 0.09884 | −0.00150 | 0.00317 | −0.06808 | −0.07253 | 0.00330 |
| 9 | 0.00000 | −0.00004 | 0.00004 | 0.00209 | −0.00070 | −0.00664 | 0.02102 |
| 10 | 0.14419 | 0.16024 | 0.01979 | 0.01887 | 0.03115 | 0.02088 | 0.00774 |
| 11 | −0.12985 | −0.20949 | −0.03755 | −0.02974 | −0.01775 | −0.01999 | −0.01075 |
| 12 | −0.00956 | 0.04288 | −0.02138 | 0.08359 | −0.03452 | −0.01153 | 0.01724 |
| 13 | −0.09948 | −0.13026 | −0.01895 | −0.03157 | −0.05340 | −0.01657 | −0.00723 |
| 14 | 0.11425 | −0.18391 | 0.03289 | −0.02422 | 0.01225 | 0.05553 | −0.02980 |
| 15 | 0.00226 | 0.01429 | 0.01004 | 0.08158 | 0.02392 | 0.01516 | 0.03194 |
| 16 | −0.15053 | −0.20236 | −0.03023 | −0.04550 | −0.07131 | −0.01882 | −0.00843 |
| 17 | −0.00312 | 0.03326 | −0.03946 | 0.07506 | 0.01836 | −0.00293 | 0.01044 |
| 18 | 0.00039 | −0.01326 | 0.05031 | −0.09545 | −0.04192 | 0.00154 | −0.01754 |
| 19 | −0.21374 | 0.08069 | −0.00338 | 0.00476 | −0.03445 | −0.01944 | 0.00245 |
| 20 | 0.43914 | 0.36082 | 0.03294 | 0.04392 | 0.12743 | 0.02053 | 0.00562 |
| 21 | −0.01830 | 0.07745 | −0.03643 | 0.08293 | −0.02234 | −0.00664 | 0.00937 |
| Σ | −0.01010 | −0.02811 | 0.00216 | 0.10536 | −0.01058 | −0.00160 | −0.00019 |

TABLE C

| K | SA3 | CMA3 | AST3 | DIS3 | PTZ3 | SAC | SLC |
|---|---|---|---|---|---|---|---|
| 1 | −0.06984 | 0.07071 | −0.00796 | 0.01164 | −0.02654 | −0.05549 | 0.01873 |
| 2 | 0.09840 | −0.17826 | 0.03585 | −0.02520 | 0.00592 | 0.07349 | −0.04434 |
| 3 | −0.09587 | 0.37567 | −0.16346 | 0.22153 | −0.00605 | −0.02132 | 0.02785 |
| 4 | 0.06903 | −0.24973 | 0.10038 | −0.13349 | 0.01032 | 0.01983 | −0.02391 |
| 5 | 0.00315 | 0.01248 | 0.00548 | 0.03633 | 0.02206 | 0.01006 | 0.01327 |
| 6 | 0.02998 | −0.10523 | 0.04104 | −0.08713 | 0.03344 | 0.01398 | −0.01635 |
| 7 | 0.89294 | 0.15301 | 0.00291 | 0.00245 | 0.03994 | 0.03605 | 0.00206 |
| 8 | −1.04782 | −0.17339 | −0.00319 | −0.00263 | −0.04458 | −0.08953 | −0.00494 |
| 9 | −0.00003 | 0.00016 | −0.00009 | 0.00091 | −0.00046 | −0.01008 | 0.01675 |
| 10 | 0.18787 | 0.19547 | 0.02260 | 0.01491 | 0.02039 | 0.02484 | 0.00861 |
| 11 | −0.12187 | −0.16701 | −0.02543 | −0.01693 | −0.01162 | −0.01876 | −0.00857 |
| 12 | −0.00449 | 0.01980 | −0.00971 | 0.04755 | −0.02260 | −0.00936 | 0.01377 |
| 13 | −0.09587 | −0.10736 | −0.01336 | −0.01804 | −0.03496 | −0.01547 | −0.00578 |
| 14 | 0.08360 | −0.12322 | 0.02018 | −0.01385 | 0.00802 | 0.04867 | −0.02391 |
| 15 | 0.00369 | 0.01791 | 0.00967 | 0.04102 | 0.01566 | 0.01585 | 0.02566 |
| 16 | −0.14631 | −0.16809 | −0.02146 | −0.02610 | −0.04669 | −0.01770 | −0.00678 |
| 17 | −0.00128 | 0.01608 | −0.02237 | 0.04318 | 0.01203 | −0.00202 | 0.00842 |
| 18 | 0.00001 | −0.00176 | 0.02865 | −0.05827 | −0.02745 | 0.00030 | −0.01484 |
| 19 | −0.18341 | 0.06157 | −0.00230 | 0.00278 | −0.02256 | −0.01871 | 0.00209 |
| 20 | 0.41217 | 0.29288 | 0.02312 | 0.02524 | 0.08344 | 0.02070 | 0.00490 |
| 21 | −0.01178 | 0.04876 | −0.02242 | 0.05111 | −0.01463 | −0.00595 | 0.00820 |
| Σ | 0.00239 | −0.00957 | −0.00197 | 0.11701 | −0.00693 | −0.00062 | 0.00091 |

In the tables shown in the above, reference symbol SA3 represents spherical aberration, reference symbol CMA3 represents coma, reference symbol AST3 represents astigmatism, reference symbol DIS3 represents distortion, reference symbol PTZ3 represents Petzval's sum, reference symbol SAC represents longitudinal chromatic aberration, and reference symbol SLC represents lateral chromatic aberration.

The telephoto zoom lens system according to the present invention is arranged that an air lens is provided in the second lens group II as described before so that aberrations of higher order are caused in a suitable degree by the two surfaces which form the air lens and spherical aberration is thereby corrected favourably over the whole zooming range. Said surfaces which form the air lens correspond to the seventh surface ($r_7$) and the eighth surface ($r_8$) in Embodiments 1, 2, 4, 6, 7, 8 and 9, the eighth surface ($r_8$) and the ninth surface ($r_9$) in Embodiment 3, and the fifth surface ($r_5$) and the sixth surface ($r_6$) in Embodiment 5.

The telephoto zoom lens system according to the present invention comprises three lens groups and is arranged that respective lens groups are moved independently of each other at the time of zooming and, especially, the second and third lens groups are moved from the wide position toward the teleposition so that the magnifications thereof increase, the telephoto zoom lens system according to the present invention being thereby arranged that the overall length of the lens system becomes extremely short in the wide position and comparatively short also in the teleposition so that the lens system as a whole can be made compact and, at the same time, aberration can be maintained in the favourably corrected state.

We claim:

1. A telephoto zoom lens system comprising, in the order from the object side, a first lens group having positive refractive power, a second lens group having negative refractive power, and a third lens group comprising a front subgroup and a rear subgroup and said third group having positive refractive power as a whole, said front subgroup having positive refractive power and consisting of two positive lenses and a cemented doublet arranged in a selected order, said telephoto zoom lens system being arranged to be zoomed by linearly moving said first lens group to the object side and non-linearly moving said second and third lens groups independently of said first lens group, said zoom lens system being arranged so that the field angle is not larger than 40° at the wide position and is not larger than 14° at the teleposition, and said zoom lens system being further arranged to fulfill the conditions (1), (2) and (3) shown below:

$$0.6 < |\beta_{2T}| < 0.95 \quad (1)$$

$$1.0 < |\beta_{3T}| \quad (2)$$

$$0.2 < |f_2|/\sqrt{f_W \cdot f_T} < 0.45 \quad (3)$$

where, reference symbol $\beta_{2T}$ represents the magnification of the second lens group in the teleposition, reference symbol $\beta_{3T}$ represents the magnification of the third lens group in the teleposition, reference symbol $f_2$ represents the focal length of the second lens group, reference symbol $f_W$ represents the focal length of the lens system as a whole in the wide position, and reference symbol $f_T$ represents the focal length of the lens system as a whole in the teleposition.

2. A telephoto zoom lens system according to claim 1 wherein a stop is disposed between the front subgroup and the rear subgroup of said third lens group.

3. A telephoto zoom lens system according to claim 1 satisfying the conditions (4) and (5) shown below:

$$0.5 < f_{3a}/f_3 < 2.5 \quad (4)$$

$$1.6 < N_{3a} \quad (5)$$

where, reference symbol $f_3$ represents the focal length of the third lens group, reference symbol $f_{3a}$ represents the focal length of the front subgroup of the third lens group, and reference symbol $N_{3a}$ represents the refractive index of the lens with positive refractive power located on the object side in the front subgroup of the third lens group.

4. A telephoto zoom lens system according to claim 1 satisfying the conditions (6) and (7) shown below:

$$0.9 < f_1/\sqrt{f_W \cdot f_T} < 1.3 \quad (6)$$

$$1.6 < N_2 < 1.85 \quad (7)$$

where, reference symbol $f_1$ represents the focal length of the first lens group, reference symbol $N_2$ represents the refractive index of the lens with positive refractive power located on the object side in the front subgroup of the third lens group.

5. A telephoto zoom lens system according to claim 1, 2, 3 or 4 wherein the front subgroup of said third lens group consists of a positive lens, a cemented doublet and a positive lens arranged in the order from the object side.

6. A telephoto zoom lens system according to claim 1, 2, 3 or 4 wherein the front subgroup of said third lens group consists of a positive lens, a positive lens and a cemented doublet arranged in the order from the object side.

7. A telephoto zoom lens system according to claim 1, wherein said first lens group comprises a cemented doublet consisting of a lens with negative refractive power and a lens with positive refractive power, said second lens group comprises a first lens with negative refractive power, a second lens with negative refractive power, and a cemented doublet consisting of a third lens with positive refractive power and a fourth lens with negative refractive power, and said third lens group comprises a front subgroup and a rear subgroup, wherein said front subgroup comprises a lens with positive refractive power, a cemented doublet, which consists of a lens with posiitve refractive power and a lens with negative refractive power, and a lens with positive refractive power, and said rear subgroup comrises a lens with positive refractive power, and a lens with negative refractive power, said telephoto zoom lens system having the following numerical data:

| f = 72.36~192.74, F 3.63~4.76 | | | |
|---|---|---|---|
| $r_1 = 83.878$ | $d_1 = 2.75$ | $n_1 = 1.7618$ | $\nu_1 = 27.11$ |
| $r_2 = 44.922$ | $d_2 = 11.21$ | $n_2 = 1.61484$ | $\nu_2 = 51.17$ |
| $r_3 = -323.79$ | $d_3 = D_1$ | | |
| $r_4 = -221.601$ | $d_4 = 1.95$ | $n_3 = 1.79952$ | $\nu_3 = 42.24$ |
| $r_5 = 103.684$ | $d_5 = 3.44$ | | |
| $r_6 = -64.073$ | $d_6 = 1.72$ | $n_4 = 1.713$ | $\nu_4 = 53.84$ |
| $r_7 = 53.652$ | $d_7 = 1.45$ | | |
| $r_8 = 51.509$ | $d_8 = 4.88$ | $n_5 = 1.80518$ | $\nu_5 = 25.43$ |
| $r_9 = -114.788$ | $d_9 = 1.88$ | $n_6 = 1.7725$ | $\nu_6 = 49.66$ |
| $r_{10} = 110.017$ | $d_{10} = D_2$ | | |
| $r_{11} = 184.354$ | $d_{11} = 4.0$ | $n_7 = 1.713$ | $\nu_7 = 53.84$ |
| $r_{12} = -94.813$ | $d_{12} = 0.1$ | | |
| $r_{13} = 50.139$ | $d_{13} = 7.5$ | $n_8 = 1.51633$ | $\nu_8 = 64.15$ |
| $r_{14} = -63.637$ | $d_{14} = 1.89$ | $n_9 = 1.7847$ | $\nu_9 = 26.22$ |
| $r_{15} = 144.542$ | $d_{15} = 0.3$ | | |
| $r_{16} = 37.545$ | $d_{16} = 5.2$ | $n_{10} = 1.51633$ | $\nu_{10} = 64.15$ |
| $r_{17} = 145.782$ | $d_{17} = 29.41$ | | |
| $r_{18} = 70.856$ | $d_{18} = 7.01$ | $n_{11} = 1.60717$ | $\nu_{11} = 40.26$ |
| $r_{19} = -86.213$ | $d_{19} = 5.09$ | | |
| $r_{20} = -26.892$ | $d_{20} = 1.7$ | $n_{12} = 1.7725$ | $\nu_{12} = 49.66$ |
| $r_{21} = -153.366$ | | | |
| f | 72.36 | 118.034 | 192.74 |
| $D_1$ | 1.66 | 29.11 | 41.74 |
| $D_2$ | 24.91 | 14.47 | 1.5 |

$\beta_{2T} = -0.857, \beta_{3T} = -1.721$ $f_1/\sqrt{f_W \cdot f_T} = 1.107, |f_2|/\sqrt{f_W \cdot f_T} = 0.306$ $\overline{N_2} = \dfrac{n_3 + n_4 + n_6}{3} = 1.762$ $f_{3a}/f_3 = 1.153, N_{3a} = n_7 = 1.713$ where, reference symbol f represents the focal length of the lens system as a whole, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's numbers of respective lenses.

8. A telephoto zoom lens system according to claim 1, wherein said first lens group comprises a cemented doublet consisting of a lens with negative refractive power and a lens with positive refractive power, said second lens group comprises a first lens with negative refractive power, a second lens with negative refractive power, a third lens with positive refractive power, and a fourth lens with negative refractive power, and said third lens group comprises a front subgroup and a rear subgroup, wherein said front subgroup comprises a lens with positive refractive power, a cemented doublet, which consists of a lens with positive refractive power and a lens with negative refractive power, and a lens with positive refractive power, and said rear subgroup comprises a lens with positive refractive power, and a lens with negative refractive power, said telephoto zoom lens system having the following numerical data:

| $f = 72.43 \sim 193.2$, F $3.63 \sim 4.77$ | | | |
|---|---|---|---|
| $r_1 = 84.247$ | | | |
| | $d_1 = 2.75$ | $n_1 = 1.7618$ | $\nu_1 = 27.11$ |
| $r_2 = 44.983$ | | | |
| | $d_2 = 11.22$ | $n_2 = 1.61484$ | $\nu_2 = 51.17$ |
| $r_3 = -317.8$ | | | |
| | $d_3 = D_1$ | | |
| $r_4 = -223.978$ | | | |
| | $d_4 = 1.93$ | $n_3 = 1.79952$ | $\nu_3 = 42.24$ |
| $r_5 = 108.014$ | | | |
| | $d_5 = 2.59$ | | |
| $r_6 = -63.567$ | | | |
| | $d_6 = 1.7$ | $n_4 = 1.713$ | $\nu_4 = 53.84$ |
| $r_7 = 53.561$ | | | |
| | $d_7 = 1.45$ | | |
| $r_8 = 51.086$ | | | |
| | $d_8 = 4.78$ | $n_5 = 1.78472$ | $\nu_5 = 25.68$ |
| $r_9 = -109.47$ | | | |
| | $d_9 = 1.0$ | | |
| $r_{10} = -112.818$ | | | |
| | $d_{10} = 2.03$ | $n_6 = 1.7725$ | $\nu_6 = 49.66$ |
| $r_{11} = 110.794$ | | | |
| | $d_{11} = D_2$ | | |
| $r_{12} = 182.968$ | | | |
| | $d_{12} = 3.97$ | $n_7 = 1.713$ | $\nu_7 = 53.84$ |
| $r_{13} = -96.002$ | | | |
| | $d_{13} = 0.1$ | | |
| $r_{14} = 49.847$ | | | |
| | $d_{14} = 7.56$ | $n_8 = 1.51633$ | $\nu_8 = 64.15$ |
| $r_{15} = -65.388$ | | | |
| | $d_{15} = 1.88$ | $n_9 = 1.78472$ | $\nu_9 = 25.71$ |
| $r_{16} = 151.999$ | | | |
| | $d_{16} = 0.3$ | | |
| $r_{17} = 37.734$ | | | |
| | $d_{17} = 5.2$ | $n_{10} = 1.51633$ | $\nu_{10} = 64.15$ |
| $r_{18} = 139.1$ | | | |
| | $d_{18} = 29.41$ | | |
| $r_{19} = 71.29$ | | | |
| | $d_{19} = 6.97$ | $n_{11} = 1.60342$ | $\nu_{11} = 38.01$ |
| $r_{20} = -86.764$ | | | |
| | $d_{20} = 5.09$ | | |
| $r_{21} = -26.785$ | | | |
| | $d_{21} = 1.7$ | $n_{12} = 1.7725$ | $\nu_{12} = 49.66$ |
| $r_{22} = -157.126$ | | | |
| f | 72.43 | 118.25 | 193.2 |
| $D_1$ | 1.66 | 29.12 | 41.74 |
| $D_2$ | 24.92 | 14.46 | 1.5 |
| $\beta_{2T} = -0.858$, $\beta_{3T} = -1.722$ | | | |

$\underline{f_1}/\sqrt{f_W \cdot f_T} = 1.105$, $|f_2|/\sqrt{f_W \cdot f_T} = 1.155$
$N_2 = 1.762$, $f_{3a}/f_3 = 1.155$, $N_{3a} = 1.713$ where, reference symbol f represents the focal length of the lens system as a whole, reference symbols $r_1$ through $r_{22}$ respectively represent radii of curvature of respective lens surfaces, reference symbols $d_1$ through $d_{21}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's numbers of respective lenses.

9. A telephoto zoom lens system according to claim 1, wherein said first lens group comprises a cemented doublet consisting of a lens with negative refractive power and a lens with positive refractive power, said second lens group comprises a first lens with negative refractive power, a cemented doublet, which consists of a second lens with negative refractive power and third lens with positive refractive power, and a fourth lens with negative refractive power, and said third lens group comprises a front subgroup and a rear subgroup, wherein said front subgroup comprises a lens with positive refractive power, a cemented doublet, which consists of a lens with positive refractive power and a lens with negative refractive power, and a lens with positive refractive power, and said rear subgroup comprises a lens with positive refractive power, and a lens with negative refractive power, said telephoto zoom lens system having the follosing numerical data:

| $f = 72.36 \sim 192.75$, F $3.63 \sim 4.76$ | | | |
|---|---|---|---|
| $r_1 = 84.454$ | | | |
| | $d_1 = 2.79$ | $n_1 = 1.7618$ | $\nu_1 = 27.11$ |
| $r_2 = 44.742$ | | | |
| | $d_2 = 11.52$ | $n_2 = 1.61484$ | $\nu_2 = 51.17$ |
| $r_3 = -302.267$ | | | |
| | $d_3 = D_1$ | | |
| $r_4 = -191.874$ | | | |
| | $d_4 = 2.22$ | $n_3 = 1.8061$ | $\nu_3 = 40.95$ |
| $r_5 = 92.941$ | | | |
| | $d_5 = 3.54$ | | |
| $r_6 = -58.921$ | | | |
| | $d_6 = 1.75$ | $n_4 = 1.691$ | $\nu_4 = 54.84$ |
| $r_7 = 40.960$ | | | |
| | $d_7 = 4.89$ | $n_5 = 1.80518$ | $\nu_5 = 25.43$ |
| $r_8 = -179.977$ | | | |
| | $d_8 = 2.09$ | | |
| $r_9 = -149.759$ | | | |
| | $d_9 = 1.7$ | $n_6 = 1.7725$ | $\nu_6 = 49.66$ |
| $r_{10} = 202.1$ | | | |
| | $d_{10} = D_2$ | | |
| $r_{11} = 207.561$ | | | |
| | $d_{11} = 3.59$ | $n_7 = 1.741$ | $\nu_7 = 52.68$ |
| $r_{12} = -95.254$ | | | |
| | $d_{12} = 0.1$ | | |
| $r_{13} = 52.147$ | | | |
| | $d_{13} = 6.75$ | $n_8 = 1.51633$ | $\nu_8 = 64.15$ |
| $r_{14} = -60.379$ | | | |
| | $d_{14} = 1.99$ | $n_9 = 1.7847$ | $\nu_9 = 26.22$ |
| $r_{15} = 156.566$ | | | |
| | $d_{15} = 0.32$ | | |
| $r_{16} = 36.682$ | | | |
| | $d_{16} = 4.81$ | $n_{10} = 1.51633$ | $\nu_{10} = 64.15$ |
| $r_{17} = 148.45$ | | | |
| | $d_{17} = 29.48$ | | |
| $r_{18} = 72.375$ | | | |
| | $d_{18} = 6.66$ | $n_{11} = 1.60342$ | $\nu_{11} = 38.01$ |
| $r_{19} = -76.106$ | | | |
| | $d_{19} = 5.1$ | | |
| $r_{20} = -26.885$ | | | |
| | $d_{20} = 1.74$ | $n_{12} = 1.7725$ | $\nu_{12} = 49.66$ |
| $r_{21} = -182.444$ | | | |
| f | 72.36 | 118.044 | 192.75 |
| $D_1$ | 1.83 | 29.12 | 41.77 |
| $D_2$ | 24.99 | 14.47 | 1.21 |
| $\beta_{2T} = -0.884$, $\beta_{3T} = -1.681$ | | | |

$\underline{f_1}/\sqrt{f_W \cdot f_T} = 1.105$, $|f_2|/\sqrt{f_W \cdot f_T} = 1.155$
$N_2 = 1.756$, $f_{3a}/f_3 = 1.149$, $N_{3a} = 1.741$ where, reference symbol f represents the focal length of the lens system as a whole, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's numbers of respective lenses.

10. A telephoto zoom lens system according to claim 1, wherein said first lens group comprises a cemented doublet consisting of a lens with negative refractive power and a lens with positive refractive power, said second lens group comprises a first lens with negative refractive power, a second lens with negative refractive power, and a cemented doublet which consists of a third lens with positive refractive power and a fourth lens with negative refractive power, and said third lens group comprises a front subgroup and a rear subgroup, wherein said front subgroup comprises a lens with positive refractive power, a cemented doublet, which consists of a lens with positive refractive power and a lens with negative refractive power, and a lens with positive refractive power, and said rear subgroup comprises a lens with positive refractive power, a lens with negative refractive power, and a lens with positive refractive power, said telephoto zoom lens system having the following numerical data:

$f = 76.61 \sim 196.01, F\ 3.63 \sim 4.77$

| | | |
|---|---|---|
| $r_1 = 83.791$ | | |
| $d_1 = 2.74$ | $n_1 = 1.7618$ | $\nu_1 = 27.11$ |
| $r_2 = 44.907$ | | |
| $d_2 = 11.18$ | $n_2 = 1.61484$ | $\nu_2 = 51.17$ |
| $r_3 = -332.153$ | | |
| $d_3 = D_1$ | | |
| $r_4 = -245.866$ | | |
| $d_4 = 1.9$ | $n_3 = 1.79952$ | $\nu_3 = 42.24$ |
| $r_5 = 104.662$ | | |
| $d_5 = 3.33$ | | |
| $r_6 = -64.998$ | | |
| $d_6 = 1.55$ | $n_4 = 1.713$ | $\nu_4 = 53.84$ |
| $r_7 = 53.723$ | | |
| $d_7 = 1.45$ | | |
| $r_8 = 51.766$ | | |
| $d_8 = 4.49$ | $n_5 = 1.80518$ | $\nu_5 = 25.43$ |
| $r_9 = -120.489$ | | |
| $d_9 = 1.55$ | $n_6 = 1.7725$ | $\nu_6 = 49.66$ |
| $r_{10} = 112.072$ | | |
| $d_{10} = D_2$ | | |
| $r_{11} = 185.508$ | | |
| $d_{11} = 3.47$ | $n_7 = 1.713$ | $\nu_7 = 53.84$ |
| $r_{12} = -98.371$ | | |
| $d_{12} = 0.02$ | | |
| $r_{13} = 49.147$ | | |
| $d_{13} = 7.09$ | $n_8 = 1.51633$ | $\nu_8 = 64.15$ |
| $r_{14} = -65.532$ | | |
| $d_{14} = 1.88$ | $n_9 = 1.7847$ | $\nu_9 = 26.22$ |
| $r_{15} = 138.949$ | | |
| $d_{15} = 0.3$ | | |
| $r_{16} = 36.586$ | | |
| $d_{16} = 4.92$ | $n_{10} = 1.51633$ | $\nu_{10} = 64.15$ |
| $r_{17} = 160.651$ | | |
| $d_{17} = 29.41$ | | |
| $r_{18} = 78.472$ | | |
| $d_{18} = 5.04$ | $n_{11} = 1.60717$ | $\nu_{11} = 40.26$ |
| $r_{19} = -81.828$ | | |
| $d_{19} = 5.10$ | | |
| $r_{20} = -25.740$ | | |
| $d_{20} = 1.70$ | $n_{12} = 1.7725$ | $\nu_{12} = 49.66$ |
| $r_{21} = -425.4833$ | | |
| $d_{21} = 1.2$ | | |
| $r_{22} = 597.165$ | | |
| $d_{22} = 3.0$ | $n_{13} = 1.60717$ | $\nu_{13} = 40.26$ |
| $r_{23} = -257.886$ | | |

| f | 76.61 | 121.44 | 196.01 |
|---|---|---|---|
| $D_1$ | 1.66 | 29.1 | 41.72 |
| $D_2$ | 24.85 | 14.77 | 1.50 |

$\beta_{2T} = -0.887, \beta_{3T} = -2.106$ $f_1/\sqrt{f_W \cdot f_T} = 1.072,\ |f_2|/\sqrt{f_W \cdot f_T} = 0.304$ $\overline{N_2} = 1.762,\ f_{3a}/f_3 = 1.123,\ N_{3a} = 1.713$ where, reference symbol f represents the focal length of the lens system as a whole, reference symbols $r_1$ through $r_{23}$ respectively represent radii of curvature of respective lens surfaces, reference symbols $d_1$ through $d_{22}$ respectively represent thicknesses of respective lenses and airspaces between respective lenses, reference symbols $n_1$ through $n_{13}$ respectively represent refractive indices of respective lenses, and reference symbols $\nu_1$ through $\nu_{13}$ respectively represent Abbe's numbers of respective lenses.

11. A telephoto zoom lens system according to claim 1, wherein said first lens group comprises a cemented doublet consisting of a lens with negative refractive power and a lens with positive refractive power, said second lens group comprises a first lens with negative refractive power, a second lens with positive refractive power, a third lens with negative refractive power, and a fourth lens with negative refractive power, and said third lens group comprises a front subgroup and a rear subgroup, wherein said front subgroup comprises a lens with positive refractive power, a cemented doublet, which consists of a lens with positive refractive power and a lens with negative refractive power, and a lens with positive refractive power, and said rear subgroup comprises a lens with positive refractive power and a lens with negative refractive power, said telephoto zoom lens system having the following numerical data:

$f = 72.33 \sim 192.74, F\ 3.51 \sim 5.16$

| | | |
|---|---|---|
| $r_1 = 86.951$ | | |
| $d_1 = 2.55$ | $n_1 = 1.7552$ | $\nu_1 = 27.51$ |
| $r_2 = 44.172$ | | |
| $d_2 = 10.5$ | $n_2 = 1.61484$ | $\nu_2 = 51.17$ |
| $r_3 = -281.699$ | | |
| $d_3 = D_1$ | | |
| $r_4 = -82.6$ | | |
| $d_4 = 1.82$ | $n_3 = 1.713$ | $\nu_3 = 53.84$ |
| $r_5 = 81.394$ | | |
| $d_5 = 0.72$ | | |
| $r_6 = 116.637$ | | |
| $d_6 = 4.8$ | $n_4 = 1.7847$ | $\nu_4 = 26.22$ |
| $r_7 = -56.462$ | | |
| $d_7 = 0.176$ | | |
| $r_8 = -103.265$ | | |
| $d_8 = 1.7$ | $n_5 = 1.713$ | $\nu_5 = 53.84$ |
| $r_9 = 63.401$ | | |
| $d_9 = 3.91$ | | |
| $r_{10} = -36.151$ | | |
| $d_{10} = 1.7$ | $n_6 = 1.713$ | $\nu_6 = 53.84$ |
| $r_{11} = -83.899$ | | |
| $d_{11} = D_2$ | | |
| $r_{12} = -141.456$ | | |
| $d_{12} = 3.6$ | $n_7 = 1.713$ | $\nu_7 = 53.84$ |
| $r_{13} = -72.555$ | | |
| $d_{13} = 0.1$ | | |
| $r_{14} = 61.298$ | | |
| $d_{14} = 6.5$ | $n_8 = 1.51633$ | $\nu_8 = 64.15$ |
| $r_{15} = -39.630$ | | |
| $d_{15} = 1.8$ | $n_9 = 1.7847$ | $\nu_9 = 26.22$ |
| $r_{16} = -173.788$ | | |
| $d_{16} = 0.3$ | | |

-continued

| $f = 72.33 \sim 192.74$, F $3.51 \sim 5.16$ | | | |
|---|---|---|---|
| $r_{17} = 31.344$ | | | |
| $d_{17} = 4.5$ | | $n_{10} = 1.48749$ | $\nu_{10} = 70.2$ |
| $r_{18} = 105.675$ | | | |
| $d_{18} = 29.41$ | | | |
| $r_{19} = 59.322$ | | | |
| $d_{19} = 6.0$ | | $n_{11} = 1.61293$ | $\nu_{11} = 37.0$ |
| $r_{20} = -132.338$ | | | |
| $d_{20} = 5.77$ | | | |
| $r_{21} = -24.874$ | | | |
| $d_{21} = 1.7$ | | $n_{12} = 1.7725$ | $\nu_{12} = 49.66$ |
| $r_{22} = -96.444$ | | | |
| $f$ | 72.33 | 118.03 | 192.74 |
| $D_1$ | 2.01 | 25.27 | 38.02 |
| $D_2$ | 24.85 | 13.58 | 1.0 |
| $\beta_{2T} = -0.502$, $\beta_{3T} = -1.924$ | | | |

$$f_1/\sqrt{f_W \cdot f_T} = 1.111, \; |f_2|/\sqrt{f_W \cdot f_T} = 0.31$$

$$\overline{N}_2 = 1.713, \; f_{3a}/f_3 = 1.136, \; N_{3a} = 1.713$$

where, reference symbol f represents the focal length of the lens system as a whole, reference symbols $r_1$ through $r_{22}$ respectively represent radii of curvature of respective lens surfaces, reference symbols $d_1$ through $d_{21}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's numbers of respective lenses.

12. A telephoto zoom lens system according to claim 1, wherein said frist lens group comprises a cemented doublet consisting of a lens with negative refractive power and lens with positive refractive power, said second lens group comprises a first lens with negative refractive power, a second lens with negative refractive power, a third lens with positive refractive power, and a fourth lens with negative refractive power, and said third lens group comprises a front subgroup and a rear subgroup, wherein said front subgroup comprises a lens with positive refractive power, a cemented doublet, which consists of a lens with positive refractive power and a lens with negative refractive power, and a lens with positive refractive power, and said rear subgroup comprises a lens with negative refractive power, and a lens with positive refractive power, said telephoto zoom lens system having the following numerical data:

| $f = 72.45 \sim 202.64$, F $3.63 \sim 5.0$ | | | |
|---|---|---|---|
| $r_1 = 84.279$ | | | |
| $d_1 = 2.58$ | | $n_1 = 1.7618$ | $\nu_1 = 27.11$ |
| $r_2 = 45.557$ | | | |
| $d_2 = 10.69$ | | $n_2 = 1.61484$ | $\nu_2 = 51.17$ |
| $r_3 = -332.467$ | | | |
| $d_3 = D_1$ | | | |
| $r_4 = -578.645$ | | | |
| $d_4 = 1.93$ | | $n_3 = 1.79952$ | $\nu_3 = 42.24$ |
| $r_5 = 79.111$ | | | |
| $d_5 = 3.05$ | | | |
| $r_6 = -51.360$ | | | |
| $d_6 = 1.7$ | | $n_4 = 1.713$ | $\nu_4 = 53.84$ |
| $r_7 = 97.923$ | | | |
| $d_7 = 1.45$ | | | |
| $r_8 = 72.884$ | | | |
| $d_8 = 4.78$ | | $n_5 = 1.78472$ | $\nu_5 = 25.68$ |
| $r_9 = -61.927$ | | | |
| $d_9 = 1.3$ | | | |
| $r_{10} = -59.306$ | | | |

-continued

| $f = 72.45 \sim 202.64$, F $3.63 \sim 5.0$ | | | |
|---|---|---|---|
| $d_{10} = 2.03$ | | $n_6 = 1.7725$ | $\nu_6 = 49.66$ |
| $r_{11} = 134.616$ | | | |
| $d_{11} = D_2$ | | | |
| $r_{12} = -201.483$ | | | |
| $d_{12} = 3.74$ | | $n_7 = 1.713$ | $\nu_7 = 53.84$ |
| $r_{13} = -50.506$ | | | |
| $d_{13} = 0.1$ | | | |
| $r_{14} = 57.135$ | | | |
| $d_{14} = 7.02$ | | $n_8 = 1.51633$ | $\nu_8 = 64.15$ |
| $r_{15} = -48.734$ | | | |
| $d_{15} = 1.88$ | | $n_9 = 1.78472$ | $\nu_9 = 25.71$ |
| $r_{16} = -2648.602$ | | | |
| $d_{16} = 0.3$ | | | |
| $r_{17} = 28.927$ | | | |
| $d_{17} = 5.26$ | | $n_{10} = 1.51633$ | $\nu_{10} = 64.15$ |
| $r_{18} = 60.932$ | | | |
| $d_{18} = 41.8$ | | | |
| $r_{19} = -18.974$ | | | |
| $d_{19} = 1.7$ | | $n_{11} = 1.7725$ | $\nu_{11} = 49.66$ |
| $r_{20} = -36.121$ | | | |
| $d_{20} = 0.5$ | | | |
| $r_{21} = 1495.592$ | | | |
| $d_{21} = 4.3$ | | $n_{12} = 1.60342$ | $\nu_{12} = 38.01$ |
| $r_{22} = -54.786$ | | | |
| $f$ | 72.45 | 121.24 | 202.64 |
| $D_1$ | 1.5 | 30.63 | 42.4 |
| $D_2$ | 23.89 | 13.84 | 1.39 |
| $\beta_{2T} = -0.787$, $\beta_{3T} = -1.96$ | | | |

$$f_1/\sqrt{f_W \cdot f_T} = 1.085, \; |f_2|/\sqrt{f_W \cdot f_T} = 0.284$$

$$\overline{N}_2 = 1.762, \; f_{3a}/f_3 = 0.990, \; N_{3a} = 1.713$$

where, reference symbol f represents the focal length of the lens system as a whole, reference symbols $r_1$ through $r_{22}$ respectively represent radii of curvature of respective lens surfaces, reference symbols $d_1$ through $d_{21}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's nubmers of respective lenses.

13. A telephoto zoom lens system according to claim 1, wherein said first lens group comprises a cemented doublet consisting of a lens with negative refracitve power and a lens with positive refractive power, said second lens group comprises a first lens with negative refractive power, a second lens with negative refractive power, and a cemented doublet which consists of a third lens with positive refractive power and a fourth lens with negative refractive power, and said third lens group comprises a front subgroup and a rear subgroup, wherein said front subgroup comprises a lens with positive refractive power, a lens with positive refractive power, and a cemented doublet which consists of a lens with positive refractive power and a lens with negative refractive power, and said rear subgroup comprises a lens with positive refractive power, and a lens with negative refractive power, said telephoto zoom lens system having the following numerical data:

| $f = 72.36 \sim 192.74$, F $3.86 \sim 4.77$ | | | |
|---|---|---|---|
| $r_1 = 85.055$ | | | |
| | $d_1 = 2.75$ | $n_1 = 1.7618$ | $\nu_1 = 27.11$ |
| $r_2 = 47.14$ | | | |
| | $d_2 = 11.21$ | $n_2 = 1.6223$ | $\nu_2 = 53.2$ |
| $r_3 = -363.21$ | | | |
| | $d_3 = D_1$ | | |

-continued f = 72.36~192.74, F 3.86~4.77

| | | | |
|---|---|---|---|
| $r_4 = -148.302$ | | | |
| | $d_4 = 1.95$ | $n_3 = 1.7725$ | $\nu_3 = 49.66$ |
| $r_5 = 123.355$ | | | |
| | $d_5 = 2.75$ | | |
| $r_6 = -65.846$ | | | |
| | $d_6 = 1.72$ | $n_4 = 1.7432$ | $\nu_4 = 49.31$ |
| $r_7 = 107.711$ | | | |
| | $d_7 = 1.61$ | | |
| $r_8 = 57.916$ | | | |
| | $d_8 = 4.88$ | $n_5 = 1.80518$ | $\nu_5 = 25.43$ |
| $r_9 = -92.956$ | | | |
| | $d_9 = 1.88$ | $n_6 = 1.7725$ | $\nu_6 = 49.66$ |
| $r_{10} = 69.016$ | | | |
| | $d_{10} = D_2$ | | |
| $r_{11} = 101.531$ | | | |
| | $d_{11} = 4.62$ | $n_7 = 1.6968$ | $\nu_7 = 55.52$ |
| $r_{12} = -108.921$ | | | |
| | $d_{12} = 0.1$ | | |
| $r_{13} = 61.034$ | | | |
| | $d_{13} = 4.49$ | $n_8 = 1.55232$ | $\nu_8 = 63.75$ |
| $r_{14} = 404.848$ | | | |
| | $d_{14} = 0.1$ | | |
| $r_{15} = 34.416$ | | | |
| | $d_{15} = 6.36$ | $n_9 = 1.48749$ | $\nu_9 = 70.2$ |
| $r_{16} = -133.036$ | | | |
| | $d_{16} = 2.2$ | $n_{10} = 1.80518$ | $\nu_{10} = 25.43$ |
| $r_{17} = 54.696$ | | | |
| | $d_{17} = 28.45$ | | |
| $r_{18} = 59.917$ | | | |
| | $d_{18} = 6.15$ | $n_{11} = 1.60717$ | $\nu_{11} = 40.26$ |
| $r_{19} = -51.699$ | | | |
| | $d_{19} = 5.46$ | | |
| $r_{20} = -29.842$ | | | |
| | $d_{20} = 1.7$ | $n_{12} = 1.7725$ | $\nu_{12} = 49.66$ |
| $r_{21} = 1020.391$ | | | |
| f | 72.36 | 118.03 | 192.74 |
| $D_1$ | 1.68 | 30.39 | 42.12 |
| $D_2$ | 26.13 | 15.79 | 2.47 |

$\beta_{2T} = -0.87$, $\beta_{3T} = 1.696$ $f_1/\sqrt{f_W \cdot f_T} = 1.106$, $|f_2|/\sqrt{f_W \cdot f_T} = 0.305$
$N_2 = 1.763$, $f_{3a}/f_3 = 1.190$, $N_{3a} = 1.69$ where, reference symbol f represents the focal length of the lens system as a whole, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's nubmers of respective lenses.

14. A telephoto zoom lens system according to claim 1, wherein said first lens group comprises a cemented doublet consisting of a lens with negative refractive power and a lens with positive refractive power, said second lens group comprises a first lens with negative refractive power, a second lens with negative refractive power, and a cemented doublet consisting of a third lens with positive refractive power and fourth lens with negative refractive power, and said third lens group comprises a front subgroup and a rear subgroup, wherein said front subgroup comprises a lens with positive refractive power, a cemented doublet, which consists of a lens with positive refractive power and a lens with negative refractive power, and a lens with positive refractive power, and said rear subgroup comprises a lens with positive refractive power, and a lens with negative refractive power, said telephoto zoom lens system having the following numerical data:

f = 72.43~202.65, F 3.71~4.6

| | | | |
|---|---|---|---|
| $r_1 = 81.035$ | | | |
| | $d_1 = 2.8$ | $n_1 = 1.7495$ | $\nu_1 = 35.27$ |
| $r_2 = 43.482$ | | | |
| | $d_2 = 11.3$ | $n_2 = 1.603$ | $\nu_2 = 65.48$ |
| $r_3 = -325.457$ | | | |
| | $d_3 = D_1$ | | |
| $r_4 = -173.865$ | | | |
| | $d_4 = 1.94$ | $n_3 = 1.8061$ | $\nu_3 = 40.95$ |
| $r_5 = 90.580$ | | | |
| | $d_5 = 3.42$ | | |
| $r_6 = -70.018$ | | | |
| | $d_6 = 1.69$ | $n_4 = 1.6968$ | $\nu_4 = 55.52$ |
| $r_7 = 57.590$ | | | |
| | $d_7 = 1.404$ | | |
| $r_8 = 54.869$ | | | |
| | $d_8 = 4.98$ | $n_5 = 1.80518$ | $\nu_5 = 25.43$ |
| $r_9 = -96.741$ | | | |
| | $d_9 = 1.99$ | $n_6 = 1.7725$ | $\nu_6 = 49.66$ |
| $r_{10} = 120.298$ | | | |
| | $d_{10} = D_2$ | | |
| $r_{11} = 137.585$ | | | |
| | $d_{11} = 3.89$ | $n_7 = 1.7200$ | $\nu_7 = 50.25$ |
| $r_{12} = -108.709$ | | | |
| | $d_{12} = 0.1$ | | |
| $r_{13} = 72.702$ | | | |
| | $d_{13} = 7.4$ | $n_8 = 1.53113$ | $\nu_8 = 62.44$ |
| $r_{14} = -53.859$ | | | |
| | $d_{14} = 1.85$ | $n_9 = 1.80518$ | $\nu_9 = 25.43$ |
| $r_{15} = 299.247$ | | | |
| | $d_{15} = 0.29$ | | |
| $r_{16} = 31.521$ | | | |
| | $d_{16} = 5.06$ | $n_{10} = 1.51633$ | $\nu_{10} = 64.15$ |
| $r_{17} = 88.374$ | | | |
| | $d_{17} = 28.94$ | | |
| $r_{18} = 63.852$ | | | |
| | $d_{18} = 6.81$ | $n_{11} = 1.59551$ | $\nu_{11} = 39.21$ |
| $r_{19} = -123.290$ | | | |
| | $d_{19} = 4.913$ | | |
| $r_{20} = -24.866$ | | | |
| | $d_{20} = 1.65$ | $n_{12} = 1.7725$ | $\nu_{12} = 49.66$ |
| $r_{21} = -85.786$ | | | |
| f | 72.43 | 121.24 | 202.65 |
| $D_1$ | 1.88 | 31.65 | 45.29 |
| $D_2$ | 27.07 | 16.13 | 1.73 |

$\beta_{2T} = 1.093$, $\beta_{3T} = -1.27$ $f_1/\sqrt{f_W \cdot f_T} = 1.075$, $|f_2|/\sqrt{f_W \cdot f_T} = 0.296$
$N_2 = 1.758$, $f_{3a}/f_3 = 1.464$, $N_{3a} = 1.720$ where, reference symbol f represents the focal length of the lens system as a whole, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's numbers of respective lenses.

15. A telephoto zoom lens system according to claim 1, whrerin said first lens group comprises a cemented doublet consisting of a lens with negative refractive power and a lens with positive refractive power, said second lens group comprises a first lens with negative refractive power, a second lens with negative refractive power, a third lens with positive refractive power, and a fourth lens with negative refractive power, and said third lens group comprises a front subgroup and a rear subgroup, wherein said front subgroup comprises a lens with positive refractive power, a cemented doublet, which consists of a lens with positive refractive power and a lens with negative refractive power, and a lens with positive refracitve power, and said rear subgroup comprises a lens with positive refractive power, and a lens with negative refractive power, said telephoto zoom lens system having the following numerical data:

| f = 72.45~192.0, F 3.76~4.77 | | | |
|---|---|---|---|
| $r_1 = 90.573$ | | | |
| | $d_1 = 2.8$ | $n_1 = 1.76182$ | $\nu_1 = 26.55$ |
| $r_2 = 46.113$ | | | |
| | $d_2 = 11.5$ | $n_2 = 1.62012$ | $\nu_2 = 49.66$ |
| $r_3 = -264.521$ | | | |
| | $d_3 = D_1$ | | |
| $r_4 = -180.985$ | | | |
| | $d_4 = 1.95$ | $n_3 = 1.80400$ | $\nu_3 = 46.57$ |
| $r_5 = 98.545$ | | | |
| | $d_5 = 3.44$ | | |
| $r_6 = -57.704$ | | | |
| | $d_6 = 1.70$ | $n_4 = 1.713$ | $\nu_4 = 53.84$ |
| $r_7 = 52.984$ | | | |
| | $d_7 = 1.443$ | | |
| $r_8 = 51.427$ | | | |
| | $d_8 = 5.00$ | $n_5 = 1.80518$ | $\nu_5 = 25.43$ |
| $r_9 = -92.833$ | | | |
| | $d_9 = 1.35$ | | |
| $r_{10} = -74.014$ | | | |
| | $d_{10} = 2.00$ | $n_6 = 1.77250$ | $\nu_6 = 49.66$ |
| $r_{11} = 141.342$ | | | |
| | $d_{11} = D_2$ | | |
| $r_{12} = 167.159$ | | | |
| | $d_{12} = 4.00$ | $n_7 = 1.72916$ | $\nu_7 = 54.68$ |
| $r_{13} = -77.137$ | | | |
| | $d_{13} = 0.1$ | | |
| $r_{14} = 50.945$ | | | |
| | $d_{14} = 7.6$ | $n_8 = 1.52542$ | $\nu_8 = 64.55$ |
| $r_{15} = -55.047$ | | | |
| $r_{16} = 144.787$ | | | |
| | $d_{15} = 1.9$ | $n_9 = 1.78470$ | $\nu_9 = 26.22$ |
| | $d_{16} = 0.3$ | | |
| $r_{17} = 38.188$ | | | |
| | $d_{17} = 5.2$ | $n_{10} = 1.51821$ | $\nu_{10} = 65.04$ |
| $r_{18} = 196.731$ | | | |
| | $d_{18} = 29.41$ | | |
| $r_{19} = 73.671$ | | | |
| | $d_{19} = 7.00$ | $n_{11} = 1.59270$ | $\nu_{11} = 35.29$ |
| $r_{20} = -134.754$ | | | |
| | $d_{20} = 5.09$ | | |
| $r_{21} = -25.945$ | | | |
| | $d_{21} = 1.70$ | $n_{12} = 1.77250$ | $\nu_{12} = 49.66$ |
| $r_{22} = -78.115$ | | | |
| f | 72.45 | 118.25 | 192.0 |
| $D_1$ | 1.86 | 25.26 | 37.66 |
| $D_2$ | 18.52 | 10.42 | 1.93 |

$\beta_{2T} = -0.62$, $\beta_{3T} = -1.50$ $f_1/\sqrt{f_W \cdot f_T} = 1.115$, $|f_2|/\sqrt{f_W \cdot f_T} = 0.270$ $N_2 = 1.763$, $f_{3a}/f_3 = 1.15$, $N_{3a} = 1.729$ where, reference symbol f represents the focal length of the lens system as a whole, reference symbols $r_1$ through $r_{22}$ respectively represent radii of curvature of respective lens surfaces, reference symbols $d_1$ through $d_{21}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's numbers of respective lenses.

* * * * *